United States Patent
Peng et al.

(10) Patent No.: US 11,784,179 B2
(45) Date of Patent: Oct. 10, 2023

(54) STRUCTURE AND METHOD OF POWER SUPPLY ROUTING IN SEMICONDUCTOR DEVICE

(71) Applicant: TAIWAN SEMICONDUCTOR MANUFACTURING COMPANY LTD., Hsinchu (TW)

(72) Inventors: Shih-Wei Peng, Hsinchu (TW); Jiann-Tyng Tzeng, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 303 days.

(21) Appl. No.: 16/888,635

(22) Filed: May 29, 2020

(65) Prior Publication Data

US 2021/0375851 A1    Dec. 2, 2021

(51) Int. Cl.
  *H01L 27/02* (2006.01)
  *G06F 30/394* (2020.01)
  *G06F 30/392* (2020.01)
  *H01L 27/092* (2006.01)
  *G06F 119/06* (2020.01)

(52) U.S. Cl.
  CPC ........ *H01L 27/0207* (2013.01); *G06F 30/392* (2020.01); *G06F 30/394* (2020.01); *H01L 27/092* (2013.01); *G06F 2119/06* (2020.01)

(58) Field of Classification Search
  CPC .. G06F 30/392; G06F 30/394; G06F 2119/06; G06F 30/3953; H01L 27/0207; H01L 27/092; H01L 27/11807; H01L 2027/11887
  See application file for complete search history.

(56) References Cited

U.S. PATENT DOCUMENTS

2020/0395354 A1* 12/2020 Lee .................. G06F 30/394
2021/0343699 A1* 11/2021 Kim .................. H01L 23/5286

* cited by examiner

*Primary Examiner* — Nelson Garces
(74) *Attorney, Agent, or Firm* — WPAT LAW; Anthony King

(57) ABSTRACT

A layout method and a layout system are disclosed. The layout method includes generating a design data comprising an electronic circuit, and generating a design layout by placing a first cell corresponding to the electronic circuit. The first cell includes a first source/drain region, a second source/drain region and a gate electrode, wherein the gate electrode define an odd-numbered track and an even-numbered track. The first cell also includes a first power rail, a first conductive via within the odd-numbered track, a second power rail and a second conductive via within the even-numbered track. The first source/drain region is electrically connected to the first power rail through the first conducive via, and the second source/drain region is electrically connected to the second power rail through the second conducive via.

20 Claims, 29 Drawing Sheets

STRUCTURE AND METHOD OF POWER SUPPLY ROUTING IN SEMICONDUCTOR DEVICE

BACKGROUND

Electronic equipment involving semiconductor devices is essential for many modern applications. Technological advances in materials and design have produced generations of semiconductor devices, in which each generation includes smaller and more complex circuits than the previous generation. In the course of advancement and innovation, functional density (i.e., the number of interconnected devices per chip area) has generally increased while geometric size (i.e., the smallest component that can be created using a fabrication process) has decreased. Such advances have increased the complexity of processing and manufacturing semiconductor devices. The manufacturing of a semiconductor device becomes more complicated in a miniaturized scale, and the increase in complexity of manufacturing may cause deficiencies such as high yield loss, reduced reliability of electrical interconnection and low testing coverage. Therefore, there is a continuous need to modify the structure and manufacturing method of the devices in electronic equipment in order to improve device robustness as well as reduce manufacturing cost and processing time.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figures 1, 2A:
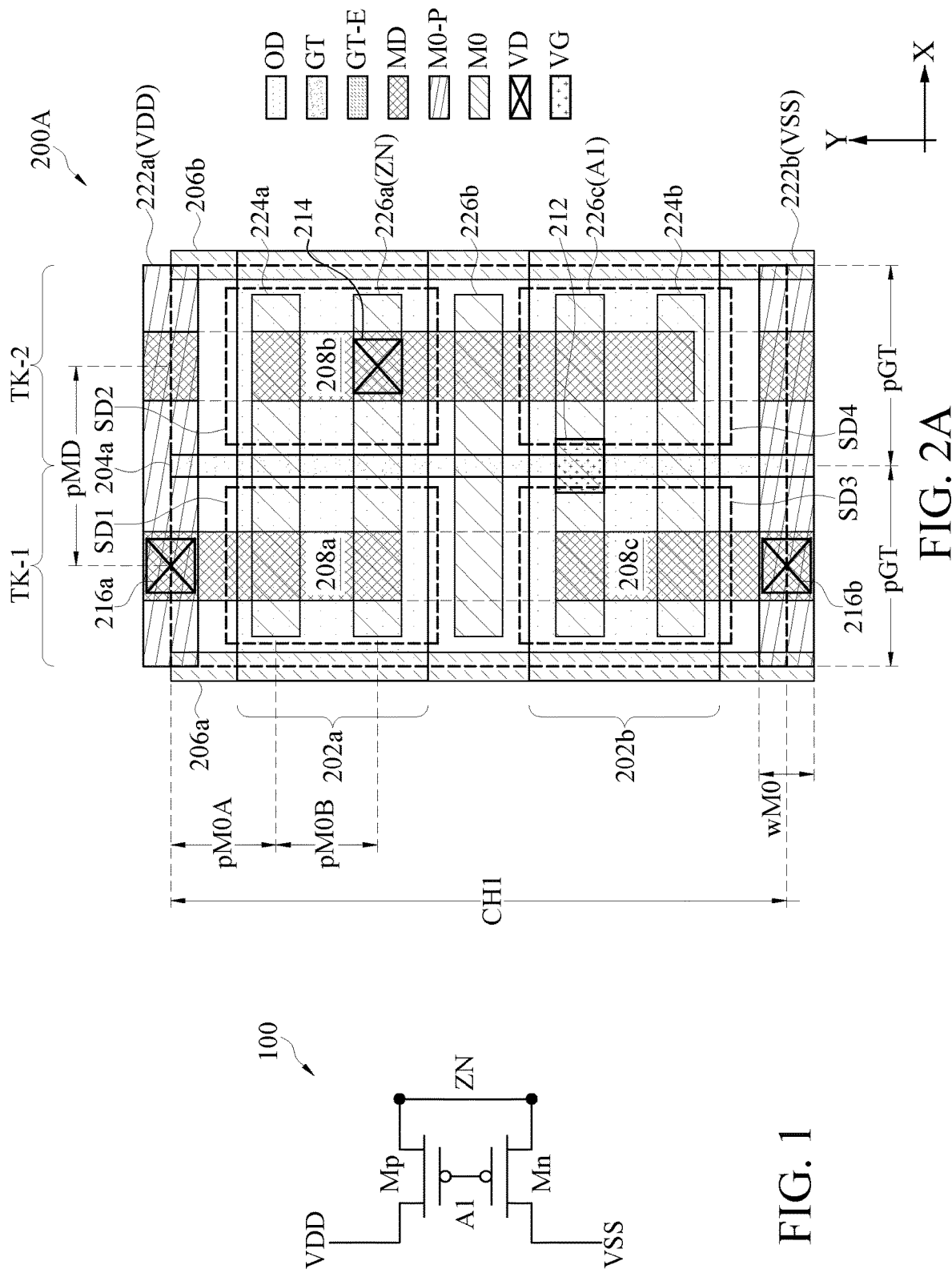
FIG. 1 is a circuit diagram of a semiconductor device, in accordance with some embodiments of the present disclosure.
FIGS. 2A to 2H are design layouts of standard cells for the circuit diagram in FIG. 1, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The term "standard cell" or "cell" used throughout the present disclosure refers to a group of circuit patterns in a design layout to implement specific functionalities of a circuit. A standard cell is comprised of various patterns in one or more layers and may be expressed as unions of polygons. A design layout may be initially constructed by an array of identical or different standard cells during the layout design stage. The geometries of the patterns in the cells may be adjusted at different stages of layout design in order to compensate for design and process effects. A standard cell may cover circuits corresponding to a portion or an entirety of a die to be manufactured. The standard cells may be accessible from cell libraries provided by semiconductor circuit manufacturers or designers. Throughout the present disclosure, the standard cells are designed for implementing electronic circuits formed by semiconductor devices, e.g., a metal-oxide-semiconductor (MOS) device, and can be a planar field-effect transistor (FET) device, a fin-type FET (FinFET) device, a gate-all-around (GAA) device, a nanowire device, a fully-depleted silicon-on-isolator (FDSOI) device, or the like. In some embodiments, the standard cells are included in a standard cell library, which may be stored in a non-transitory computer-readable storage medium and accessed by a processor in a layout operation.

FIG. 1 is a circuit diagram of a semiconductor device 100, in accordance with some embodiments of the present disclosure. The semiconductor device 100 is an inverter device in the present embodiment. The semiconductor device 100 includes a P-type MOS device Mp and an N-type MOS device Mn, in which the gate terminals of the MOS devices Mp and Mn are coupled together at an input node A1, and the drain terminals of the MOS devices Mp and Mn are coupled together at an output node ZN. During operation, the semiconductor device 100 is biased to a first voltage VDD at a source terminal of the P-type MOS device Mp and biased to a second voltage VSS at a source terminal of the N-type MOS device Mn.

Figure 3A:
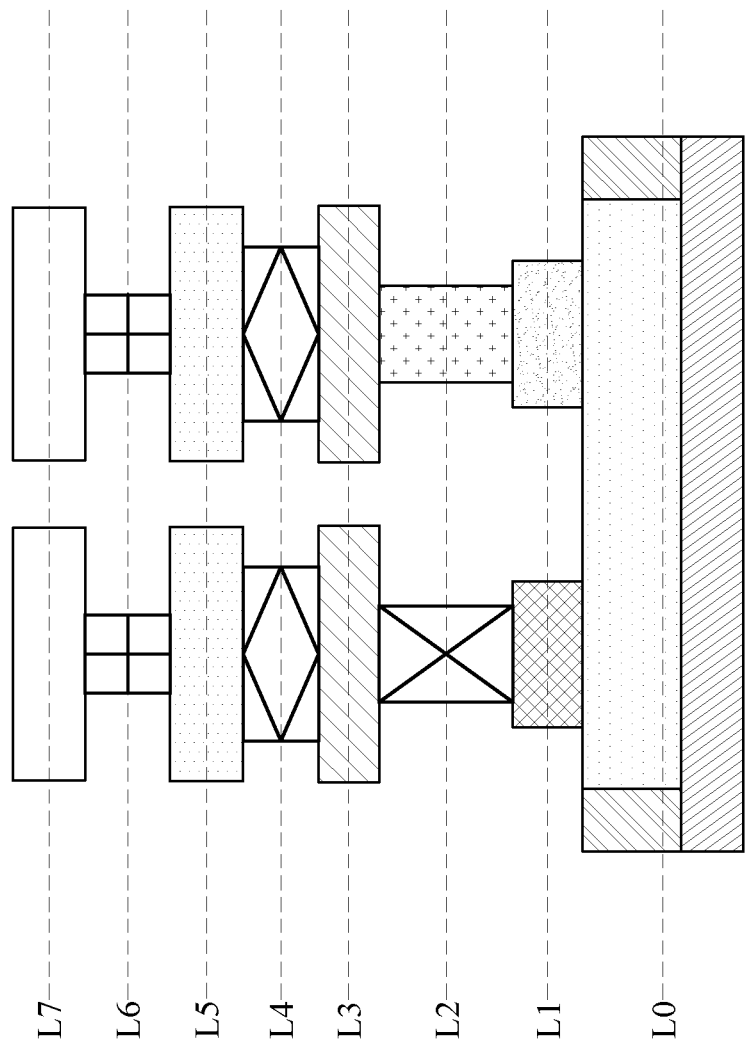
FIG. 3A is a cross-sectional view showing a vertical layer arrangement of a semiconductor device, in accordance with some embodiments of the present disclosure.

FIG. 2A is a design layout of a standard cell 200A of the semiconductor device 100 in FIG. 1, in accordance with some embodiments of the present disclosure. Referring to FIG. 2A, multiple layers are illustrated and overlaid one another along with various patterns in the respective layers from a top-view perspective. FIG. 3A is a cross-sectional view showing a vertical arrangement of the patterns in the respective layers of the semiconductor device 100, in accordance with some embodiments of the present disclosure.

Referring to FIG. 3A, a substrate layer L0 is formed or provided, which may be formed of a silicon substrate or other suitable semiconductor substrate. An active region OD is arranged in the substrate layer L0 and exposed through an upper surface of the substrate layer L0. Although not separately shown, the active region OD may include a first source/drain region, a second source/drain region and a channel region of the semiconductor device 100 interposed between the two source/drain regions. The source/drain regions in the active region may be an N-type active region doped with N-type impurities such as arsenic, phosphorus, or the like, or a P-type active region doped with P-type impurities such as boron or the like. The channel region in the active region may be undoped or lightly doped. In some embodiments where a raised active region or a FinFFT device is involved, the active region OD may have an upper surface higher than the upper surface of the substrate layer L0 and extends into a gate layer L1 over the substrate layer L0. In some embodiments, the substrate layer L0 further includes isolation structures defining and laterally surrounding the active region OD. In some embodiments, the isolation structures are formed of dielectric materials, such as oxide or nitride, and may be referred to as shallow trench isolation (STI).

A gate electrode GT is provided in the gate layer L1 over the active region OD. The gate electrode GT may be formed of a conductive material, such as doped polysilicon or formed of a metal gate comprising metallic materials such as tungsten, and cobalt, and other work function adjusting metals, such as Ti, Al, TiAl, TiN, TaC, and the like. Further, a gate-layer conductive line MD is also provided in the gate layer L1 over the active region OD adjacent to the gate electrode GT. Although not explicitly shown in FIG. 3A, a gate dielectric film formed of dielectric materials may be arranged between the channel region and the gate electrode GT.

A plurality of conductive line layers, e.g., layers L3, L5 and L7, and a plurality of conductive via layers, e.g., layers L2, L4 and L6, are provided over the gate layer L1. Each of the conductive line layers includes a plurality of parallel conductive lines, e.g., conductive lines M0, M1 and M2, and each of the conductive via layers includes at least one conductive via, e.g., conductive vias VG, VD, V0 and V1. These conductive lines (including the gate-layer conductive line MD) and the conductive vias may be formed of conductive materials, such as copper, tungsten, aluminum, titanium, tantalum, alloys thereof, or the like. The conductive line layers are electrically interconnected through the intervening conductive via layers. For example, the conductive line layers L3, L5 and L7 are arranged over one another and interconnected through the conductive via layers L4 and L6, respectively. The conductive line layer L3 is further electrically connected to the gate layer L1 through the conductive via layer L2 therebetween, in which a conductive line M0 in the conductive line layer L3 is electrically connected to the gate electrode GT through a gate via VG and another conductive line M0 is electrically connected to the gate-layer conductive line MD through a drain via VD. The numbers and materials of the conductive lines and conductive vias shown in FIG. 3A are for illustrative purposes only. Other numbers of layers, materials, and configurations of the semiconductor device 100 is within the contemplated scope of the present disclosure.

Referring to FIG. 2A, the standard cell 200A includes active regions (OD) 202a and 202b arranged in the substrate layer L0. The active regions 202a and 202b may extend in the row direction along the x-axis. In some embodiments, the active regions 202a and 202b are a P-type active region and an N-type active region, respectively. However, in other embodiments, the active regions 202a and 202b are an N-type active region and a P-type active region, respectively. The active regions 202a and 202b are defined and separated from each other by isolation structures STI.

The standard cell 200A includes a gate electrode (GT) 204a disposed in the gate layer L1 over the active regions 202a and 202b. The gate electrode 204a extends in the column direction along the y-axis perpendicular to the x-axis. In some embodiments, the gate electrode 204a serves as a functional gate electrode in forming a MOS device.

The design layout further includes two cell-edge gate electrodes (GT-E) 206, i.e., 206a and 206b, in the gate layer L1 that extend in the column direction on a left cell side and a right cell side, respectively, of the standard cell 200A. The cell-edge gate electrodes 206 are parallel to the gate electrode 204a. In some embodiments, the cell-edge gate electrodes 206 are not functioning in forming a MOS device. A gate electrode pitch pGT is defined as a distance between adjacent gate electrodes (e.g., the gate electrode 204a) or between the gate electrode 204a and one of adjacent cell-edge gate electrodes 206.

Source/drain regions SD1 and SD2 are defined in the active region 202a and delimited by the gate electrode 204a and the cell-edge gate electrodes 206, in which the source/drain regions SD1 and SD2 correspond to the source terminal and drain terminal, respectively, of the P-type MOS device Mp of FIG. 1. The active region 202a covered by the gate electrode 204a between the source/drain regions SD1 and SD2 is defined as the channel region of the P-type MOS device Mp of FIG. 1. Similarly, Source/drain regions SD3 and SD4 are defined in the active region 202b and delimited by the gate electrode 204a and the cell-edge gate electrodes 206, in which the source/drain regions SD3 and SD4 correspond to the source terminal and drain terminal, respectively, of the N-type MOS device Mn of FIG. 1. The active region 202b covered by the gate electrode 204a between the source/drain regions SD3 and SD3 is defined as the channel region of the N-type MOS device Mn of FIG. 1.

Tracks TK are defined as regions of the standard cell 200A between adjacent gate electrodes 204a and 206 from a top-view perspective, in which each track is in a strip shape and extends in the column direction. For example, a track TK-1 is defined as a strip between the cell-edge gate electrode 206a and the gate electrode 204 from a top-view perspective, and a track TK-2 is defined as a strip between the cell-edge gate electrode 206b and the gate electrode 204 from a top-view perspective. Throughout the present disclosure, the tracks are further classified into odd-numbered tracks (e.g., track TK-1) and even-numbered tracks (e.g., track TK-2) alternatingly arranged with the odd-numbered tracks. In some embodiments, the source/drain regions SD1 and SD3 are within the track TK-1 and the source/drain regions SD2 and SD4 are within the track TK-2.

The standard cell 200A also includes gate-layer conductive lines (MD) 208 arranged in the gate layer L1. The gate-layer conductive lines 208 are arranged parallel to the gate electrodes 204a within the respective tracks TK. For example, gate-layer conductive lines 208a and 208c are arranged within the track TK-1 and a gate-layer conductive line 208b is arranged in the track TK-2. The gate-layer conductive lines 208 arranged in the same track, e.g., the gate-layer conductive lines 208a and 208c, may be aligned in the column direction. Referring to FIG. 2A and FIG. 3A, the gate-layer conductive line 208a crosses and is electrically connected to the source/drain region SD1, and the gate-layer conductive line 208c crosses and is electrically connected to the source/drain region SD3. The gate-layer conductive line 208b crosses the source/drain regions SD2 and SD4 and electrically connects the source/drain region SD2 to the source/drain region SD4.

The gate-layer conductive lines 208 arranged within different tracks have a pitch pMD in the row direction. In some embodiments, the pitch pMD is substantially equal to the pitch pGT of the gate electrodes.

The standard cell 200A further includes power rails (M0-P) 222 and conductive lines (M0) 224 and 226 arranged in the conductive line layer L3 and extending in the row direction. The power rails 222, which includes power rails 222a and 222b, and conductive lines 224, which includes conductive lines 224a and 224b, and conductive lines 226, which includes conductive lines 226a, 226b and 226c, are arranged in parallel, in which the power rails 222a and 222b are arranged on an upper cell side and a lower cell side, respectively, of the standard cell 200A. In some embodiments, the power rails 222a and 222b are configured to supply a first voltage VDD and a second voltage VSS, respectively. In some embodiments, the first voltage VDD is a positive voltage and the second voltage VSS is ground.

In some embodiments, the power rails 222 and the conductive lines 224 and 226 have substantially equal widths wM0 in the column direction. The conductive lines 224 and 226 are equally spaced between the power rails 222a and 222b with a pitch pM0B in the column direction. Further, each of the conductive lines 222 is spaced from its adjacent conductive line 224 by a pitch pM0A in the column direction. In some embodiments, the pitch pM0A is substantially equal to the pitch pM0B. In some embodiments, a cell height CH1 of the standard cell 200A is defined as a pitch between the power rails 222a and 222b measured in the column direction and is determined according to a total number of the conductive lines 224 and 226 accommodated within the standard cell 200A. As shown in FIG. 2A for the depicted embodiment, the number of conductive lines 224 and 226 is five. In an embodiment, the pitch pM0A or pM0B is in a range between 0.15 times CH1 and 0.25 times CH1.

The standard cell 200A also includes in the conductive via layer L2 one or more conductive vias 212, 214 and 216 for electrically connecting the gate layer L1 to the conductive line layer L3. The conductive via 212 is arranged as a gate via over the gate electrode 204a and electrically connects the gate electrode 204a to the conductive line 226c, where the conductive line 226c serves as an input pin of the standard cell 200A and corresponds to the input node A1 of the semiconductor device 100. The conductive via 214 is arranged as a drain via over the gate-layer conductive line 208b and electrically connects the gate-layer conductive line 208b to the conductive line 226a, where the conductive line 226b serves as an output pin of the standard cell 200A and corresponds to the output node ZN of the semiconductor device 100. The conductive vias 216a and 216b are arranged as power vias over the power rails 222a and 222b, respectively, and electrically connect the gate-layer conductive lines 208a and 208c to the power rails 222a and 222b, respectively.

A first biasing (power-supplying) path of the standard cell 200A for supplying the first voltage VDD is formed between the power rail 222a and the source/drain region SD1 through the conductive vias 216a and the gate-layer conductive line 208a, and a second biasing (power-supplying) path of the standard cell 200A for supplying the second voltage VSS is formed between the power rail 222b and the active region 202b through the conductive vias 216b and the gate-layer conductive line 208b.

In some embodiments, according to a design rule for a biasing path involving the power rail 222 (which may be a lower power rail in the standard cell 200A), if any source/drain region, e.g., the source region SD1 through SD4, is biased by the power rail 222 in the conductive line layer L3, the corresponding biasing (power-supplying) path is to connect such power rail 222a or 222b through the power via 218a or 218b, respectively, respectively, in which the power via 218a or 218b is to be arranged within an odd-numbered track, e.g., track TK-1. According to the design rule for the biasing path involving the power rail 222, the gate-layer conductive line, e.g., 208a or 208b, arranged within the odd-numbered track TK-1, is used to electrically connect the power via, e.g., 218a or 218b, within the same odd-numbered track for forming the biasing path.

In some embodiments, according to the design rule for the biasing path involving the power rail 222, any two conductive vias arranged within an odd-number track, e.g., track TK-1, are spaced by at least two times the pitch pM0A or pM0B. In some embodiments, according to the design rule for the biasing path involving the power rail 222, if there are conductive vias in the conductive via layer L2 present within an odd-numbered track, such conductive vias are not allowed to be disposed directly over the conductive lines 224, which are immediately adjacent to the power rails 222. In other words, the conductive vias in the conductive via layer L2 and within the odd-numbered tracks are only allowed to land on the power rails 222 or the conductive lines 226. In some embodiments, the conductive vias in the conductive via layer L2 within the odd-numbered tracks are only allowed to be arranged directly over or aligned with the power rails 222.

As the device size of the semiconductor device 100 continues to reduce, the pitch pM0A also made less progressively, which may reach as small as 14 nm or less. In some situations, such small pitch pM0A of the conductive vias in the conductive via layer L2 imposes difficulty to the manufacturing process of the semiconductor device 100 and some defects such as bridging between adjacent conductive vias may occur. The defects resulting from the manufacturing limitation can be reduced or mitigated through managing the locations of adjacent conductive vias in the same standard cell. That is, if two adjacent vias within a standard cell are to be formed within a same track, they have a pitch of at least two times the pitch pM0A or pM0B. Further, another via bridging problem may result from two adjacent vias in different standard cells when these two cells are placed abutting each other during a placement operation. For example, one out of the adjacent vias connects to the power rail 222a in one cell while the other connecting to the conductive lines 224a in the other cell. According to the design rule for the biasing path involving the power rail 222, since there are no adjacent conductive vias allowed to land on the power rails 222 and their adjacent conductive lines 224 in the odd-numbered tracks, the enlarged via pitch in the od-numbered tracks makes it sufficient in manufacturing the vias with less bridging issues. The semiconductor device 100 can be fabricated with minimized defects.

Figures 2B, 2C:
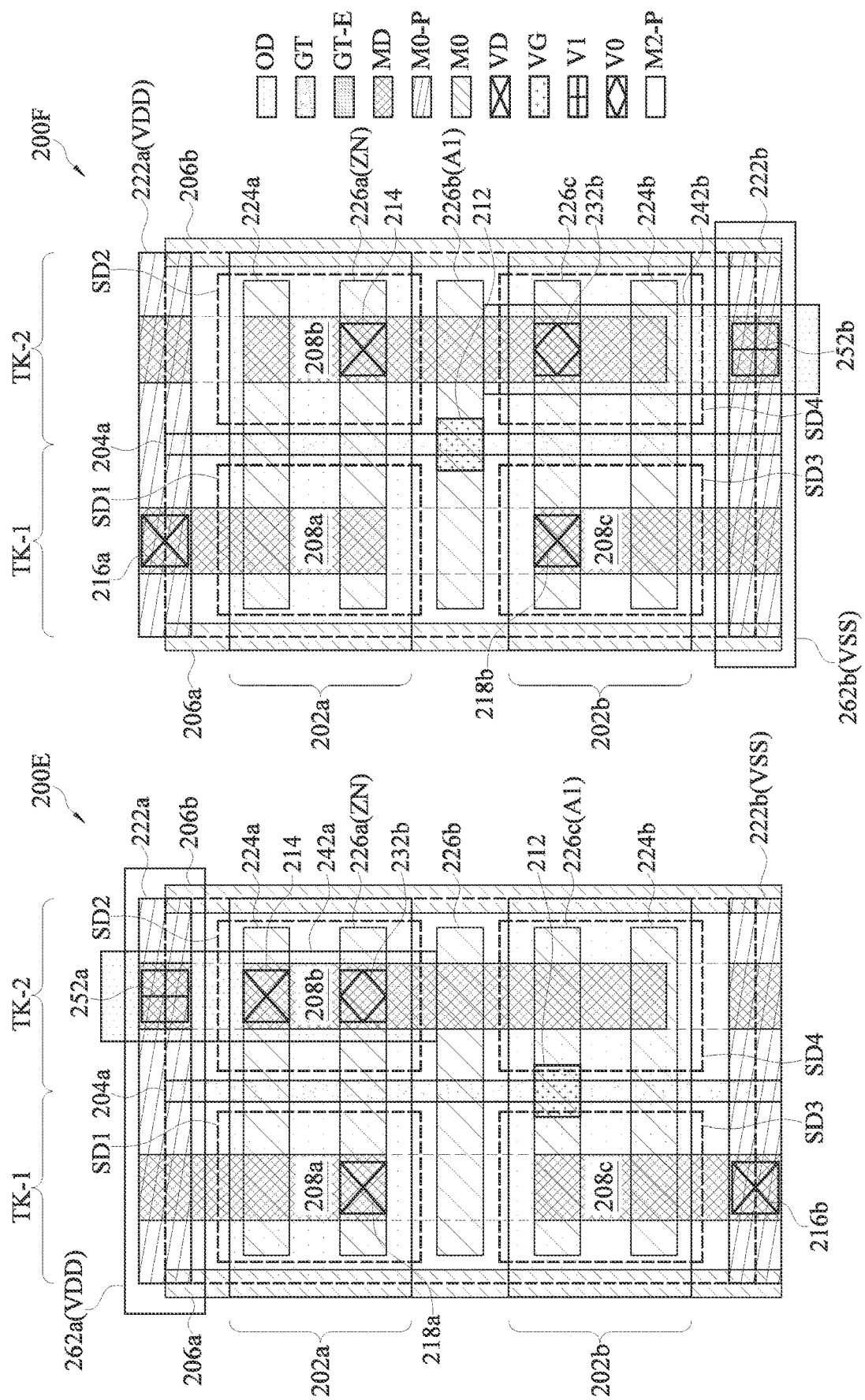

FIG. 2B is a design layout of a standard cell 200B of the semiconductor device 100 in FIG. 1, in accordance with some embodiments of the present disclosure. The standard cell 200B is similar to the standard cell 200A in many aspects, and therefore the similar descriptions are omitted for brevity. One difference between the standard cell 200B and the standard cell 200A lies in the conductive via 214, which in the present embodiment electrically connects the gate-layer conductive line 208b to the conductive line 224a, in which the conductive line 224a serves as the output pin of the semiconductor device 100 and corresponds to the output node ZN of FIG. 1. Further, the standard cells 200A and 200B have similar configurations of the second biasing path for supplying the second voltage VSS while differing in the configurations of the first biasing path for supplying the first voltage VDD.

The standard cell 200B includes a conductive via 218a arranged in the conductive via layer L2 which is directly over the conductive line 226a and electrically connecting the gate-layer conductive line 208a to the conductive line 226a. A conductive via 232a is arranged in the conductive via layer L4 and is directly over the conductive line 226a within the track TK-2. A conductive line 242a extends in the column direction in the conductive line layer L5 and is directly over the gate-layer conductive line 208b within the track TK-2. A conductive via 252a is arranged in the conductive via layer L6 and is directly over the conductive line 232a and the power rail 222a within the track TK-2. A power rail (M2-P) 262a extends in the row direction in the conductive line layer L7 and directly over the power rail 222a. The conductive line 242a overlaps the conductive via 252a and the power rail 262a form a top-view perspective. In some embodiments, the power rail 262a is configured to supply the first voltage VDD. As a result, the first biasing path of the standard cell 200B for supplying the first voltage VDD is formed between the power rail 262a and the source/drain region SD1 through the conductive vias 252a, the conductive line 242a, the conductive via 232a, the conductive via 218a, and the gate-layer conductive line 208a.

FIG. 2C is a design layout of a standard cell 200C of the semiconductor device 100 in FIG. 1, in accordance with some embodiments of the present disclosure. The standard cell 200C is similar to the standard cell 200A in many aspects, and therefore the similar descriptions are omitted for brevity. Specifically, the standard cells 200A and 200C have similar configurations of the first biasing path for supplying the first voltage VDD while differing in the configurations of the second biasing path for supplying the second voltage VSS.

The standard cell 200C includes a conductive via 218b arranged in the conductive via layer L2 which is directly over the conductive line 226c and electrically connecting the gate-layer conductive line 208c to the conductive line 226c. A conductive via 232b is arranged in the conductive via layer L4 and is directly over the conductive line 226c within the track TK-2. A conductive line 242b extends in the column direction in the conductive line layer L5 and is directly over the gate-layer conductive line 208b within the track TK-2. A conductive via 252b is arranged in the conductive via layer L6 and is directly over the conductive line 232b and the power rail 222b within the track TK-2. A power rail (M2-P) 262b extends in the row direction in the conductive line layer L7 and directly over the power rail 222b. The conductive line 242b overlaps the conductive via 252b and the power rail 262b form a top-view perspective. In some embodiments, the power rail 262b is configured to supply the second voltage VSS. As a result, the second biasing path of the standard cell 200C for supplying the second voltage VSS is formed between the power rail 262b and the source/drain region SD2 through the conductive vias 252b, the conductive line 242b, the conductive via 232b, the conductive via 218b, and the gate-layer conductive line 208a.

In some embodiments, according to a design rule for the biasing path involving the power rail 262 (which may be an upper power rail in the standard cell 200C), if a source/drain region are biased by the power rail 262a or 262b of the conductive line layer L7 rather than by other power rails (e.g., the power rails 222), the corresponding biasing paths are to connect the power rail 262a or 262b through the power via 252a or 252b, respectively, and the power via 252a or 252b is arranged within an even-numbered track, e.g., track TK-2. In some embodiments, according to the design rule for the biasing path involving the power rail 262, if there are conductive vias in the conductive via layer L2 present within the even-numbered tracks such as track TK-2, such conductive vias are not allowed to land on or overlap the power rails 222. In other words, the conductive vias in the conductive via layer L2 within the even-numbered track TK-2 are only allowed to be arranged directly below or aligned with the conductive lines 224 and 226. As discussed previously, according to a design rule, if two adjacent vias within a standard cell are to be formed within a same track, they have a pitch of at least two times the pitch pM0A or pM0B. Since no conductive via is allowed to be directly below the power rails 222, the pitch between conductive vias in the column direction in the even-numbered tracks can be made at least time times the pitch pM0A or pM0B even when the adjacent vias come from adjacent standard cells.

Figure 3B:
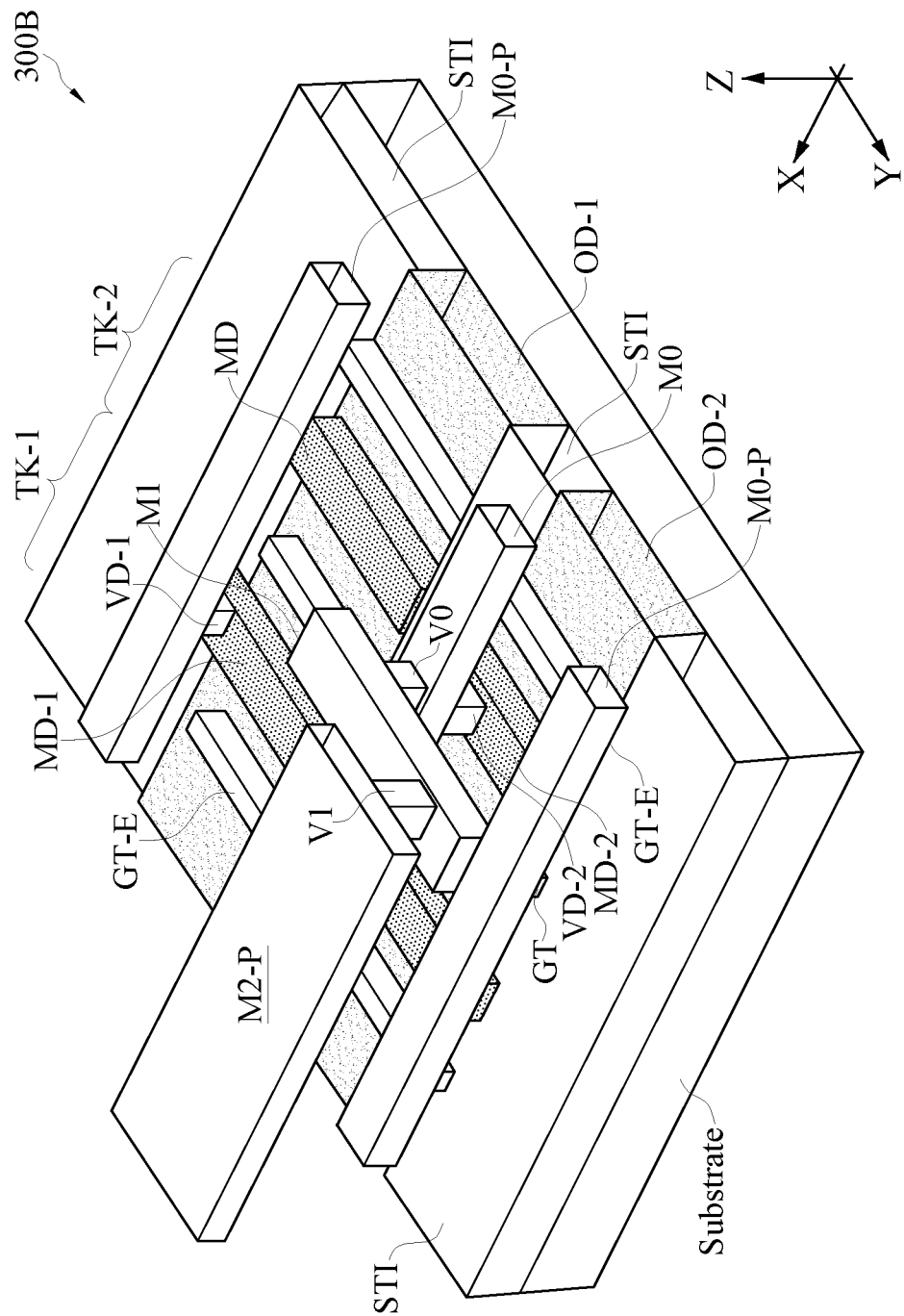
FIG. 3B is a perspective view of a semiconductor device, in accordance with some embodiments of the present disclosure.

FIG. 3B is a perspective view 300B of a semiconductor device 100, in accordance with some embodiments of the present disclosure. The perspective view 300B merely illustrates the components forming first biasing path and the second biasing path according to the design rules for the biasing paths involving the power rails 222 and 262 as discussed above. For example, the first biasing path for supplying the first voltage VDD involving the power rail M0-P is provided within the odd-number track TK-1 between the power rail M0-P (which is referred to as a lower power rail) arranged in the conductive line layer L3 and the source/drain region OD-1 through the gate-layered conductive line MD-1 and the conductive via VD-1, both within the odd-numbered track TK-1. The conductive via VD-1 is aligned with the power rail M0-P to which it is connected. Further, a second biasing path involving the power rail M2-P for supplying the second voltage VSS is provided between the power rail M2-P (which is referred to as an upper power rail) in the conductive line layer L7 and the source/drain region OD-2 through the conductive via V1, the conductive line M1, the conductive via V0, the conductive line M0, the gate-layered conductive line MD-2 and the conductive via VD-2. The conductive via V1 is electrically connected to the conductive line M1, in which both are arranged within the track TK-2.

Figure 2D:
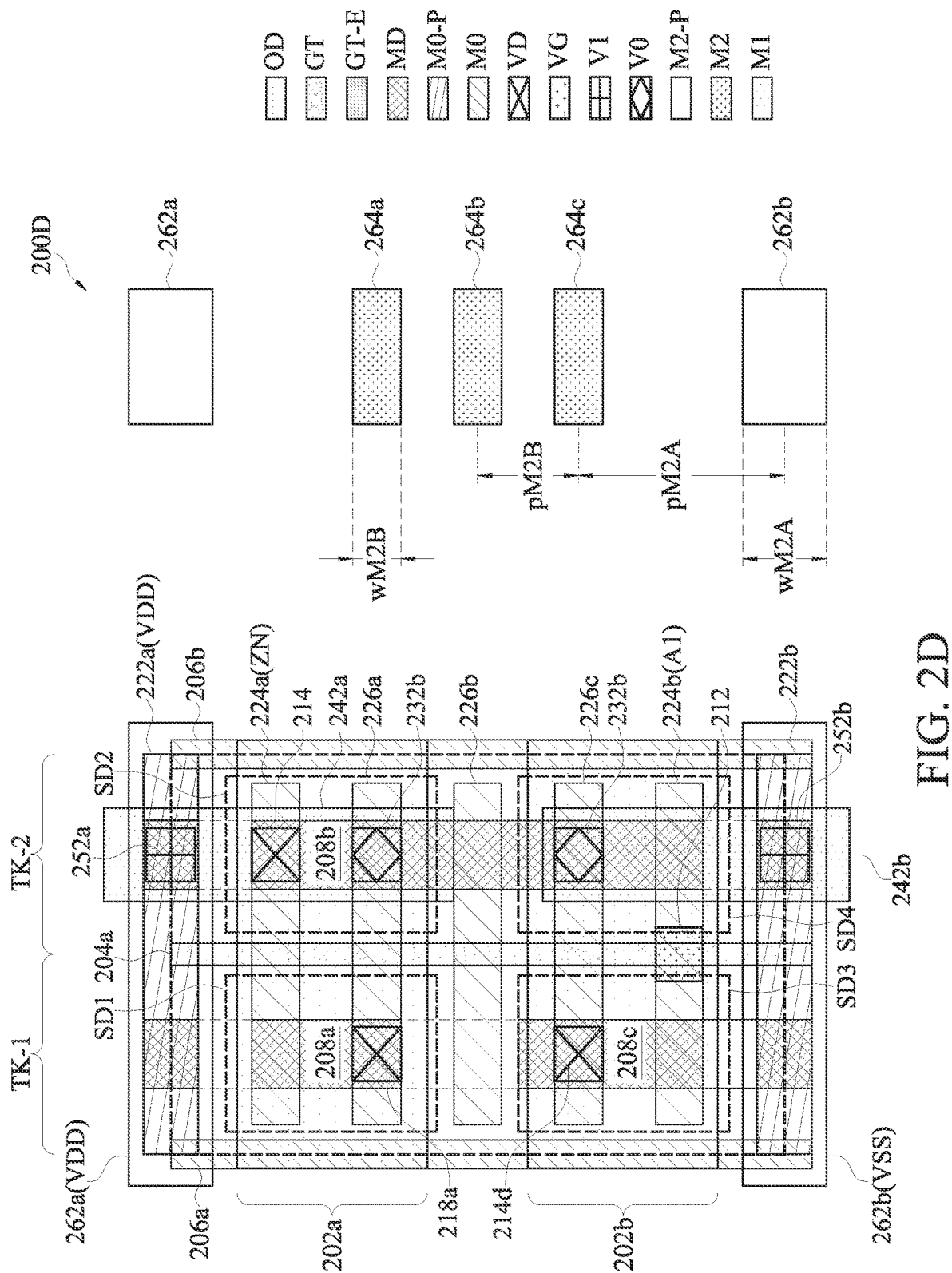
Figures 2E, 2F:
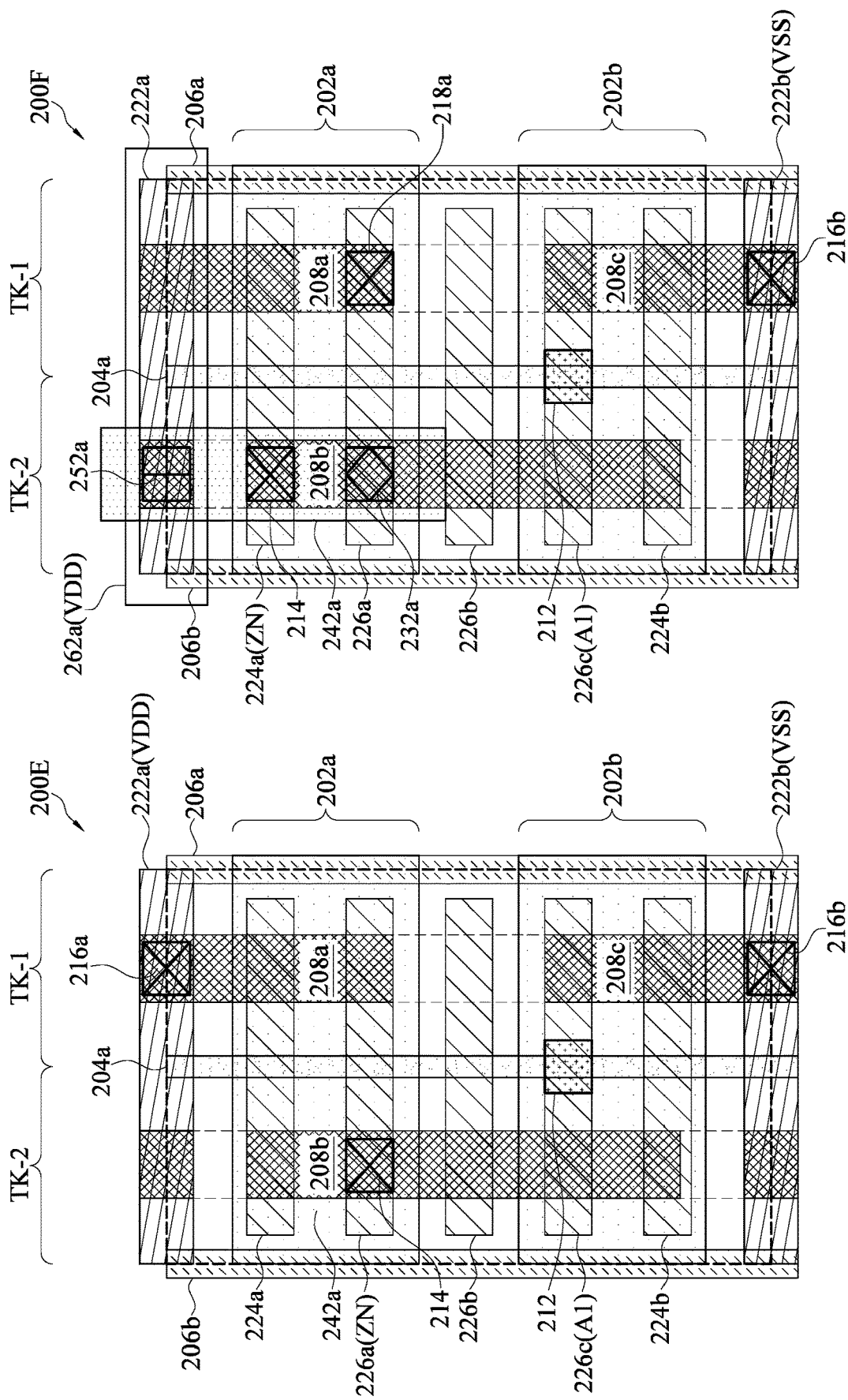
Figure 2H:
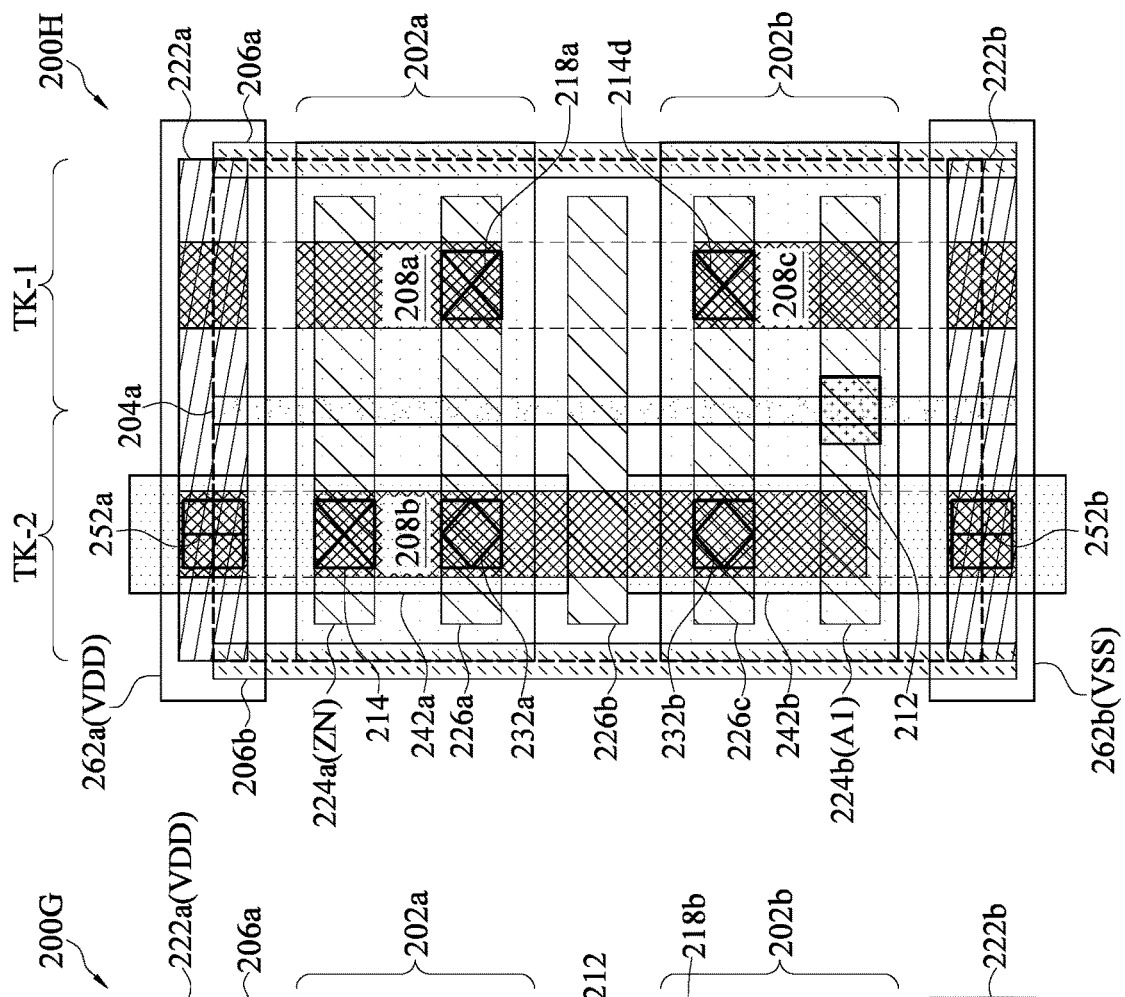
Figure 2G:
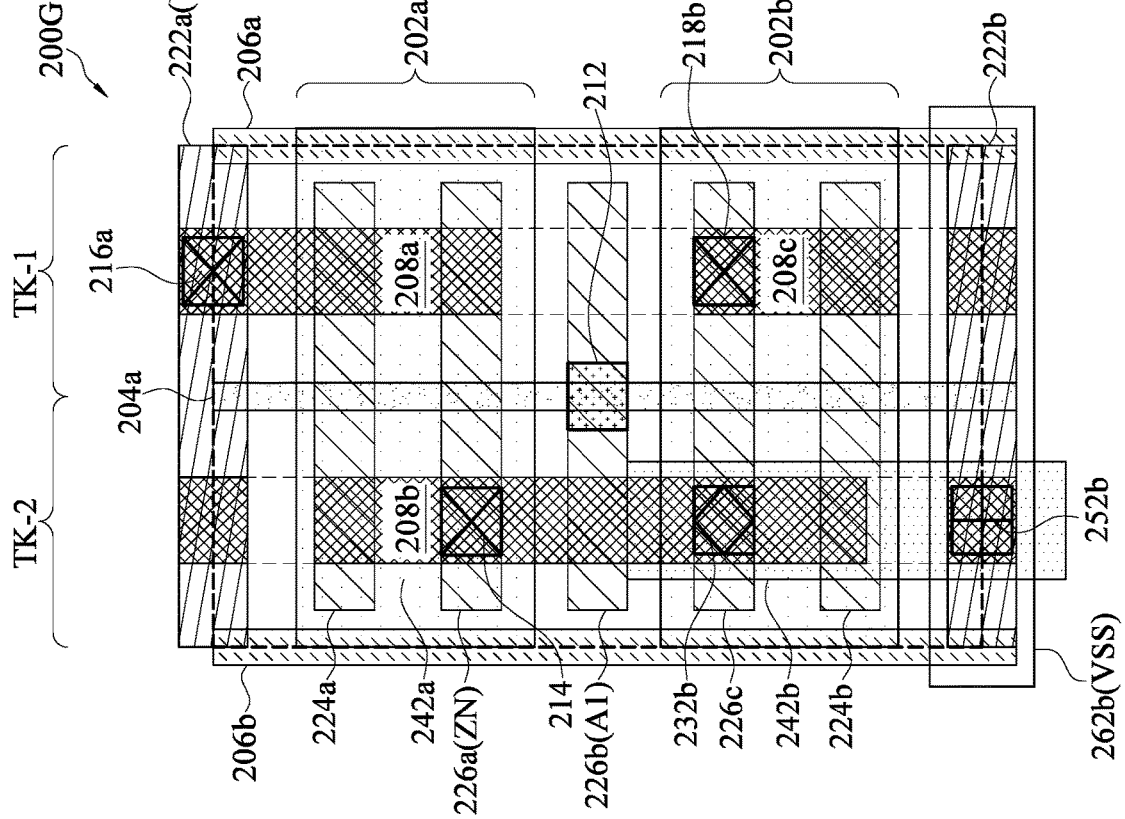

FIG. 2D is a design layout of a standard cell 200D of the semiconductor device 100 in FIG. 1, in accordance with some embodiments of the present disclosure. The standard cell 200D is generated by combining the features of the standard cells 200A, 200B and 200C. The location of the conductive via 212, which is different from that in the standard cell 200D, electrically connects the gate electrode 204a to the conductive line 224b, in which the conductive line 224b serves as the input pin of the semiconductor device 100. Further, the standard cell 200D have configurations similar to those of the standard cell 200B regarding the first biasing path of supplying the first voltage VDD and configurations similar to those of the standard cell 200C regarding the second biasing path of supplying the second voltage VSS.

FIG. 2D further illustrates at the right-hand side of the standard cell 200D conductive lines (M2) 264, e.g., 264a, 264b and 264c, arranged in the conductive line layer L7 and extending in the row direction. The conductive lines 264 are equally spaced between the power rails 262a and 262b with a pitch pM2B in the column direction in a manner similar to the conductive lines (M0) 224 and 226 in the conductive line layer L5, although they are only conceptually illustrated to the right-hand side of FIG. 2D in order not to obscure the features of the underlying layers. The conductive lines 264 may also be included in the standard cells 200A to 200D in a similar manner.

Each of the power rails 262 is spaced from its adjacent conductive line 264 by a pitch pM2A in the column direction. The conductive lines 264 have a pitch pM2B. In some embodiments, the pitch pM2A is substantially equal to the pitch pM2B. In some embodiments, a total number of the conductive lines 224 and 226 is less than six, e.g., four or five, for achieving the goal of reduced cell heights of advanced standard cells. In an embodiment, the pitch pM2A or pM2B is in a range between 0.2 times CH1 and 0.25 times CH1. In some embodiments, a total number of the conductive lines 264 is three, and the pitch pM2A or pM2B is greater than the pitch pM0A shown in FIG. 2A. As a result, the conductive vias in the conductive via layer L6 can be successfully formed to connect to adjacent conductive lines 264 without leading to adverse effects, such as via bridging.

In some embodiments, the power rails 262 have a substantially equal width wM2A measured in the column direction. In some embodiments, the conductive lines 264 have a substantially equal width wM2B measured in the column direction. In some embodiments, the width wM2A is greater than the width wM2B and wM0 in an effort to reduce resistance of the biasing path that runs through the power rails 262. In some embodiments, the increased width wM2A can aids in increasing the via pitch pM2A. In some embodiments, the width wM2A is in a range between two times the width wM0 or wM2B and 3.5 times the width wM0 or wM2B.

FIGS. 2E to 2H are design layout of standard cells 200E, 200F, 200G and 200H, respectively, of the semiconductor device 100 in FIG. 1, in accordance with some embodiments of the present disclosure. The standard cells 200E through 200H are mirrored to the standard cells 200A through 200D, respectively. Accordingly, the leftmost (first) tracks of the standard cells 200A through 200D are designated as an odd-numbered track, i.e., track TK-1, while the leftmost (first) tracks of the standard cells 200E through 200H are designated as an even-numbered track, i.e., track TK-2. The diversity of the standard cells 200A through 200H in terms of the parity of the leftmost (first) track may aids in improving the flexibility and utilization of cell placement, as are elaborated in subsequent paragraphs.

Figure 4A:
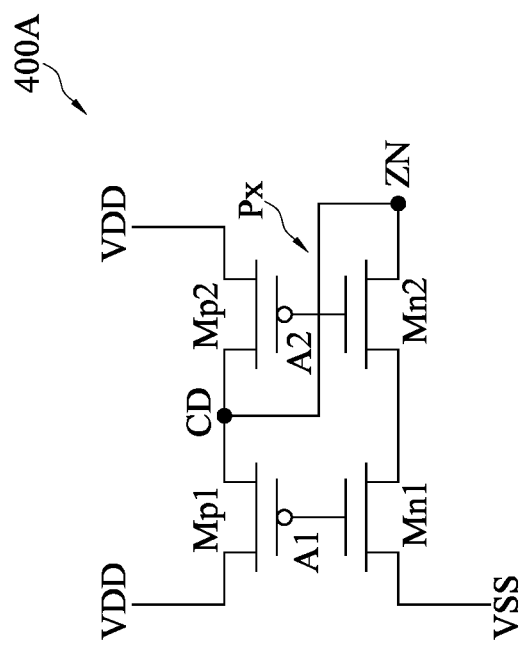
FIG. 4A is a circuit diagram of a semiconductor device, in accordance with some embodiments of the present disclosure.

FIG. 4A is a circuit diagram of a semiconductor device 400A, in accordance with some embodiments of the present disclosure. The semiconductor device 400A is a two-input NAND device in the present embodiment. The semiconductor device 400A includes two P-type MOS device Mp1 and Mp2 and two N-type MOS devices Mn1 and Mn2, in which an input node A1 is coupled to gate terminals of the MOS devices Mp1 and Mn1, an input node A2 is coupled to gate terminals of the MOS devices Mp2 and Mn2, and an output node ZN is provided at a node coupling a source region of the N-type MOS Mn2 to a common drain terminal CD of the P-type MOS devices Mp1 and Mp2. During operation, the semiconductor device 400A is biased to the first voltage VDD at source terminals of the respective P-type MOS devices Mp1 and Mp2, and biased to the second voltage VSS at source terminals of the respective N-type MOS devices Mn1 and Mn4.

Figure 4B:
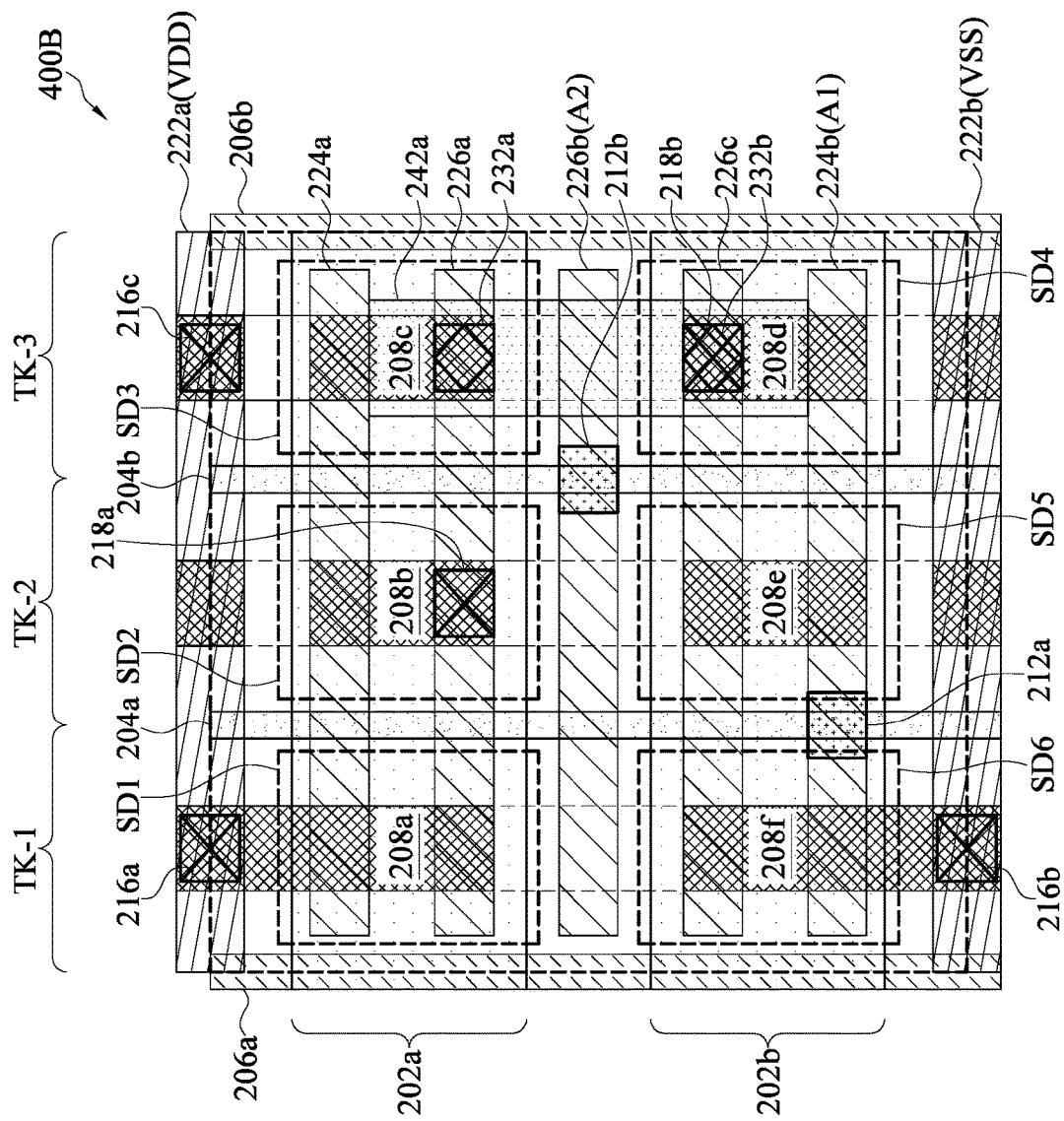
FIGS. 4B to 4D are design layouts of standard cells for the circuit diagram in FIG. 4A, in accordance with some embodiments of the present disclosure.
Figure 4C:
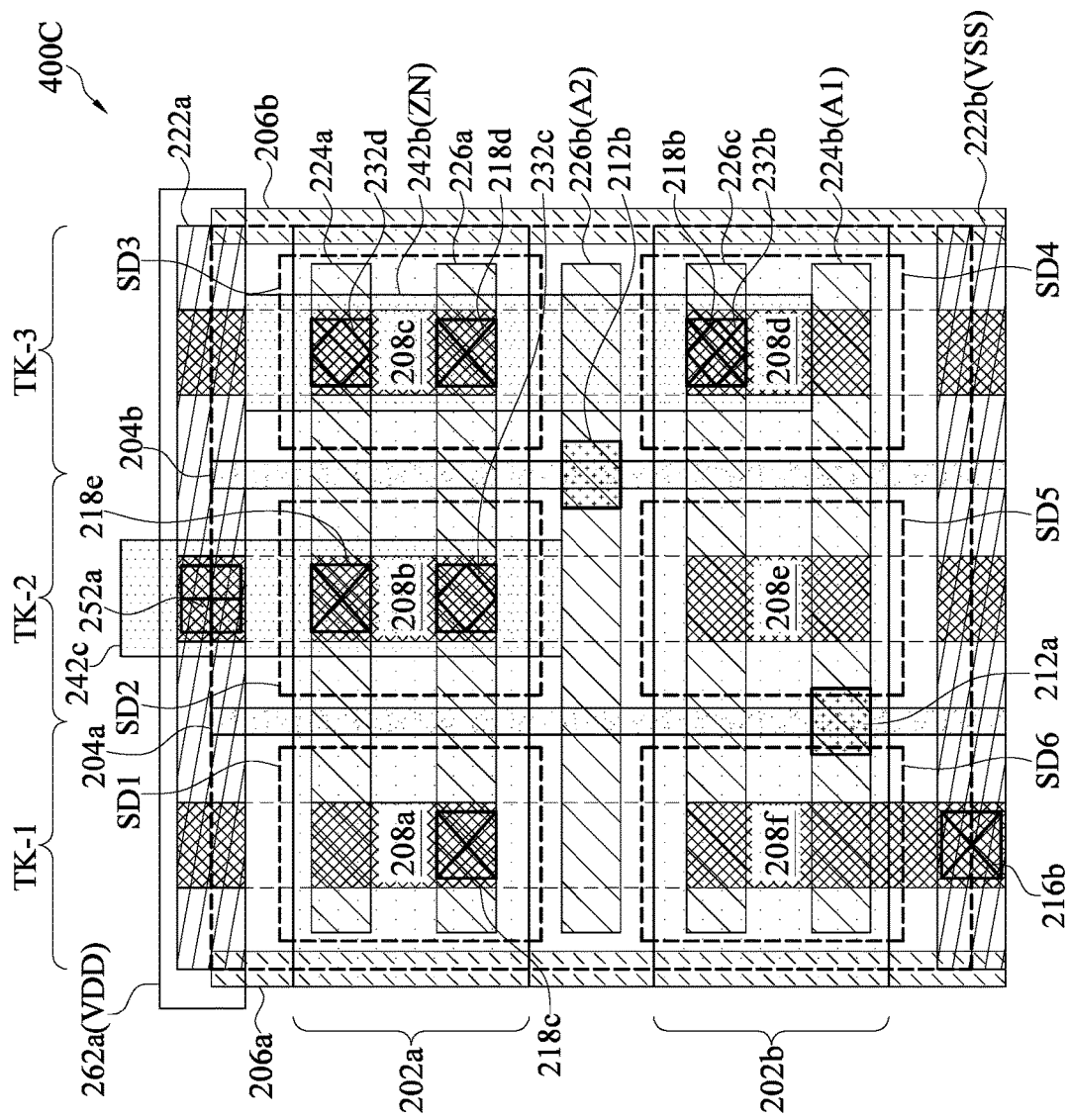
Figure 4D:
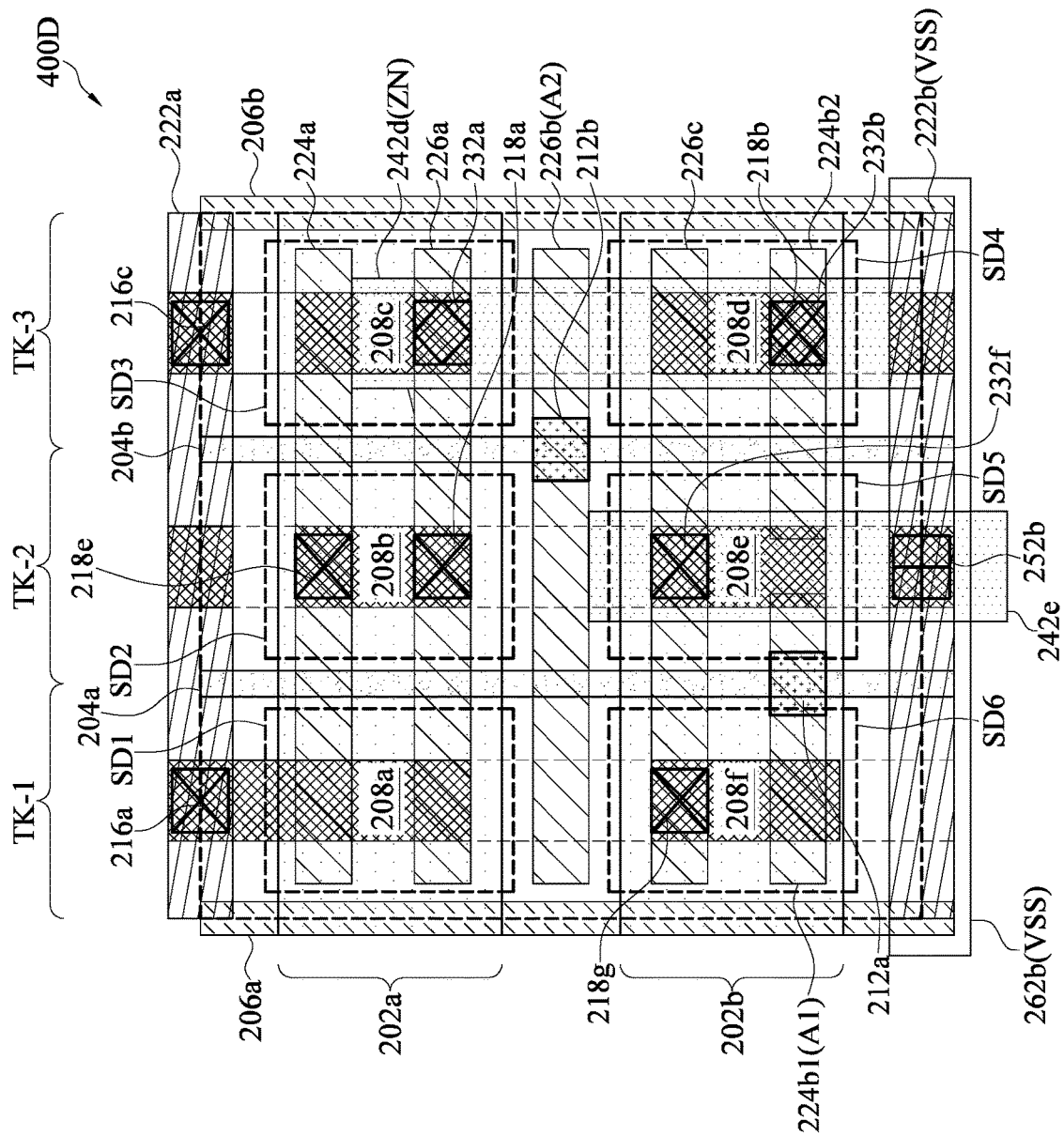

FIGS. 4B to 4D are design layouts of standard cells 400B, 400C and 400D, respectively, of the semiconductor device 400A in FIG. 4A, in accordance with different configurations. Each of the standard cells 400B to 400D includes two active regions 202a and 202b in the substrate layer L0 with reference to FIG. 3A. In some embodiments, the active regions 202a and 202b may be a P-type active region and an N-type active region, respectively. Each of the standard cells 400B to 400D also includes in the gate layer L1 two gate electrodes 204a and 204b, two cell-edge gate electrodes 206a and 206b, and six source/drain regions SD1 through SD6 defined by the gate electrodes 204a and 204b and the cell-edge gate electrodes 206a and 206b. The source/drain regions SD1 and SD6 are arranged in the track TK-1, the source/drain regions SD2 and SD5 are arranged in the track TK-2, and the source/drain regions SD3 and SD4 are arranged in the track TK-3. Each of the standard cells 400B to 400D includes gate-layer conductive lines 208a, 208b, 208c, 208d, 208e and 208f arranged in the gate layer L1 directly over the active regions SD1, SD2, SD3, SD4, SD5 and SD6, respectively. Additionally, each of the standard cells 400B to 400D includes power rails 222 and conductive lines 224 and 226 in the conductive line layer L3. The materials and configurations of the abovementioned features are similar to those described with reference to FIGS. 2A-2H, 3A and 3B, and thus their descriptions are omitted for brevity. At least one of the standard cells 400B to 400D include one of conductive vias 212, 214, 216 and 218 in the conductive via layer L2, conductive vias 232 in the conductive via L4 and conductive vias 252 in the conductive via L6, and details of these conductive vias are provided in the following paragraphs.

Each of the standard cells 400B to 400D includes a conductive via 212a serving as a gate via and electrically connecting the gate electrode 204a to the conductive line 224b, in which the conductive line 224b corresponds to the input node A1 of the semiconductor device 400A (FIG. 4D shows that the standard cell 400C includes partitioned conductive lines 224b1 and 224b2 as a variant of the conductive line 224b and the gate electrode 204a is connected to the conductive lines 224b1). Similarly, each of the standard cells 400B to 400D includes a conductive via 212b serving as a gate via and electrically connecting the gate electrode 204b to the conductive line 226b, in which the conductive line 226b corresponds to the input node A2 of the semiconductor device 400A.

Referring to FIGS. 4A and 4B, an electrical connection Px of FIG. 4A between the terminal CD and the output node ZN is implemented by an interconnection path in FIG. 4B between the source/drain region SD2 and the source/drain region SD4 through the gate-layer conductive line 208b, the conductive via 218a arranged in the track TK-2, the conductive line 226a, a conductive via 232a arranged in the track TK-3, the conductive line 242a extending in the column direction in the track TK-3, the conductive via 232b arranged in the track TK-3, the conductive line 226c, and the conductive via 218b arranged in the track TK-3, in which the conductive line 242a serves as an output pin and corresponds to the output node ZN of FIG. 4A.

Referring to FIG. 4C, the electrical connection Px is implemented by the interconnection path between the source/drain region SD2 and the source/drain region SD4 through the gate-layer conductive line 208b, the conductive via 218e arranged in the track TK-2, the conductive line 224a, the conductive via 232d arranged in the track TK-3, the conductive line 242b extending in the column direction in the track TK-3, the conductive via 232b arranged in the track TK-3, the conductive line 226c, and the conductive via 218b arranged in the track TK-3, in which the conductive line 242b serves as an output pin and corresponds to the output node ZN of FIG. 4A.

Referring to FIG. 4D, the electrical connection Px is implemented by the interconnection path between the source/drain region SD2 and the source/drain region SD4 through the gate-layer conductive line 208b, the conductive via 218a, the conductive line 226a, the conductive via 232a arranged in the track TK-3, the conductive line 242d extending in the column direction in the track TK-3, the conductive via 232e arranged in the track TK-3, the conductive line 224b2, and the conductive via 218f arranged in the track TK-3, in which the conductive line 242d serves as an output pin and corresponds to the output node ZN of FIG. 4A.

The standard cells 400B to 400D may have the same or different configurations for the first and second biasing paths. Referring to FIGS. 4B and 4D, each of the first biasing paths for supplying the first voltage VDD is formed between the power rail 222a and the source/drain regions SD1 and SD3 through the respective conductive vias 216a and 216c, that are arranged directly below the power rail 222a in compliance with the design rule for the power rail 222, and the respective gate-layer conductive lines 208a and 208c. Referring to FIGS. 4B and 4C, each of the second biasing paths for supplying the second voltage VSS is formed between the power rail 222b and the source/drain region SD6 through the conductive via 216b, that are arranged directly below the power rail 222b in compliance with the design rule for the power rail 222, and the gate-layer conductive lines 208f.

Referring to FIG. 4C, the first biasing path for supplying the first voltage VDD is formed between a power rail 262a, that is arranged in the conductive line layer L7, and the source/drain regions SD1 and SD3 through the conductive via 252a that is arranged in the conductive via layer L6 and directly below the power rail 262a within the track TK-2 in compliance with the design rule for the power rail 262, the conductive line 242c extending in the column direction in the conductive line layer L5 within the track TK-2, the conductive via 232c arranged in the conductive via layer L4, the conductive line 226a, the conductive vias 218c and 218d arranged in the conductive via layer L2 and within the tracks TK-1 and TK-3, respectively, and the gate-layer conductive lines 208a and 208c, respectively.

Referring to FIG. 4D, the second biasing path for supplying the second voltage VSS is formed between a power rail 262b, that is arranged in the conductive line layer L7, and the source/drain region SD6 through the conductive via 252b that is arranged in the conductive via layer L6 and directly below the power rail 262b within the track TK-2 in compliance with the design rule for the power rail 262, the conductive line 242e extending in the column direction in the conductive line layer L5, the conductive via 232f arranged in the conductive via layer L4, the conductive line 226c, the conductive via 218g arranged in the conductive via layer L2 and the gate-layer conductive line 208f.

Figure 4E:
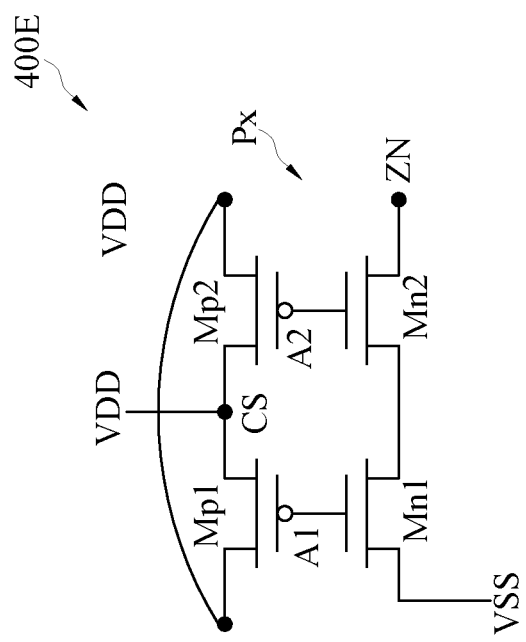
FIG. 4E is a circuit diagram of a semiconductor device, in accordance with some embodiments of the present disclosure.

FIG. 4E is a circuit diagram of a semiconductor device 400E, in accordance with some embodiments of the present disclosure. The semiconductor device 400E is a two-input NAND device and has components similar to those of the semiconductor device 400A. The semiconductor device 400E is different from semiconductor device 400A in that the first voltage VDD is supplied to a common source terminal CS, and the output node ZN is provided to connect drain terminals of the P-type MOS devices Mp1 and Mp2 to the drain terminal of the N-type MOS device Mn2 through an electrical connection Px.

Figure 4F:
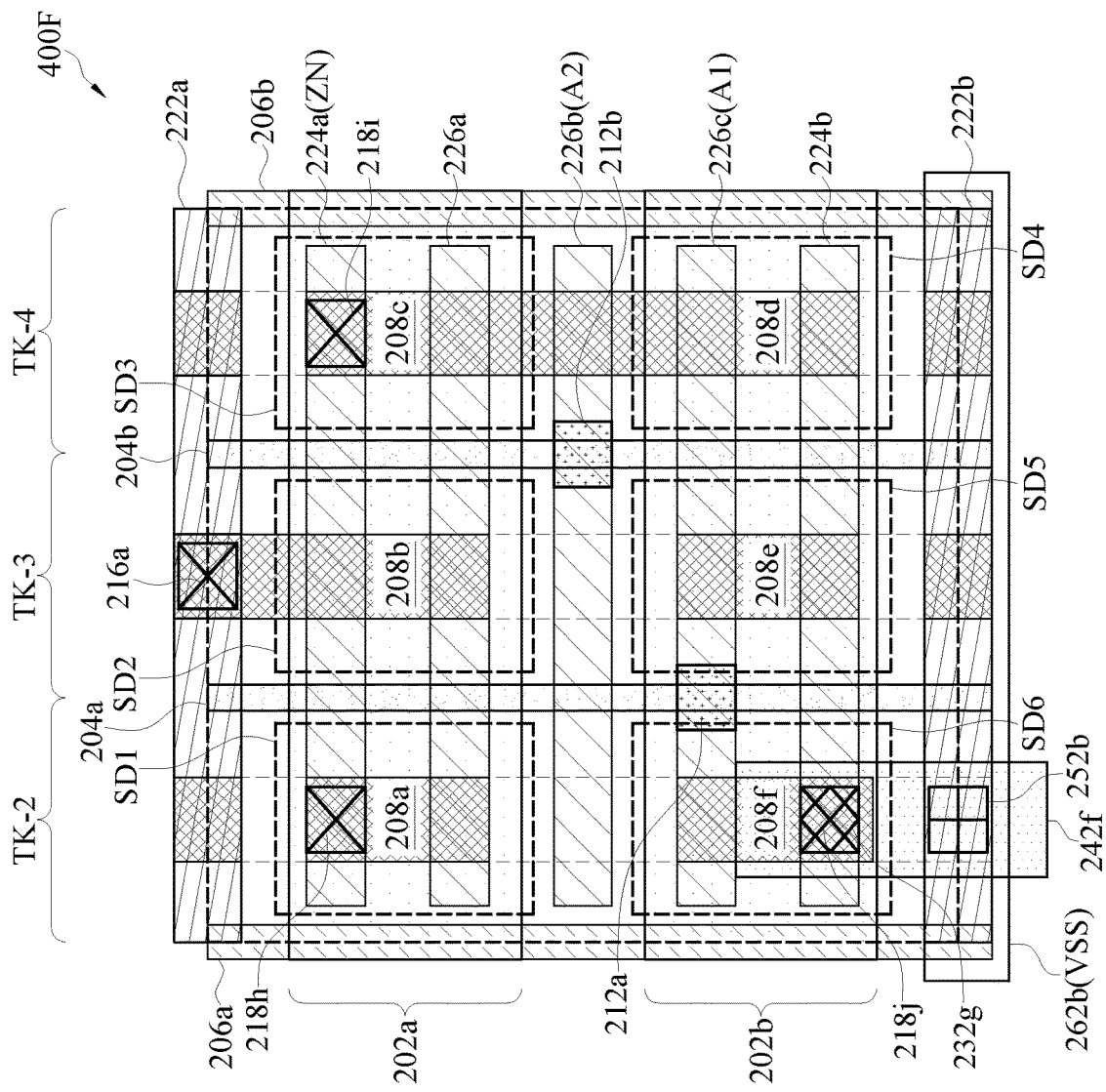
FIGS. 4F and 4G are design layouts of standard cells for the circuit diagram in FIG. 4E, in accordance with some embodiments of the present disclosure.
Figure 4G:
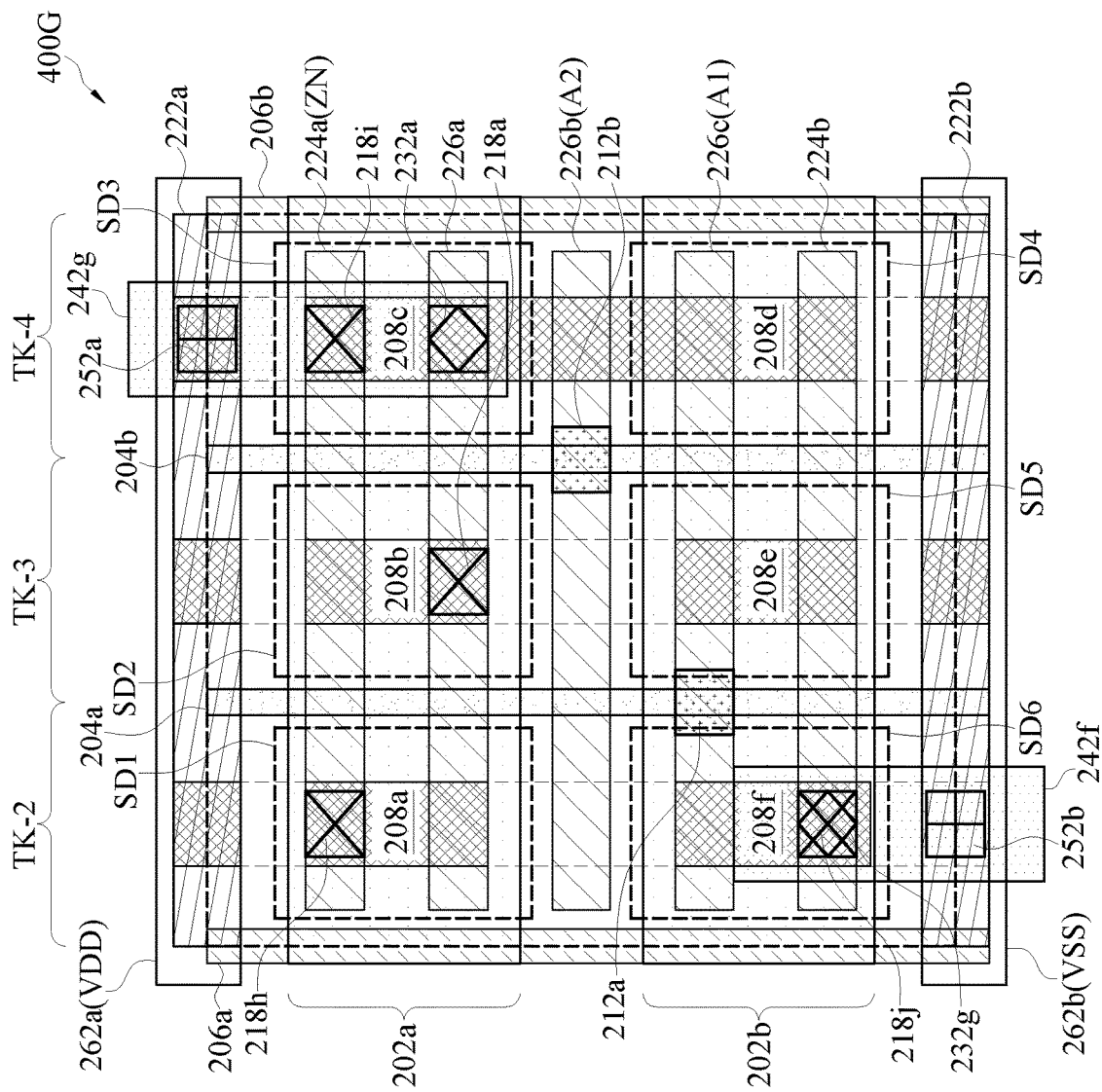

FIGS. 4F and 4G are design layouts of standard cells 400F and 400G, respectively, of the semiconductor device 400E, in accordance with different configurations. The standard cells 400F and 400G have features similar to the standard cells 400B to 400D, and descriptions of these features are not repeated for brevity. One of the differences lies in that each of the standard cells 400F and 400G includes a conductive via 212a serving as the gate via and electrically connecting the gate electrode 204a to the conductive line 226c, which serves as an output pin and corresponds to the output node ZN of FIG. 4E. Further, three tracks TK-2, TK-3 and TK-4 are defined for the standard cells 400F and 400G in contrast to the tracks TK-1 through TK-3 in the standard cells 400B to 400D, and the electrical connection Px in FIG. 4E is implemented by an interconnection path formed between the source/drain regions SD1, SD3 and SD4 through the gate-layer conductive lines 208a and 208c, the conductive vias 218h and 218i arranged within the tracks TK-2 and TK-4, the conductive line 224a, and interconnected gate-layer conductive lines 208c and 208d within the track TK-4.

According to the design rule for the biasing paths involving the power rails 222 and 226, the first and second biasing paths are formed in response to the designation of tracks TK-2, TK-3 and TK-4 in standard cells 400F and 400G. Referring to FIG. 4F, the first biasing path for supplying the first voltage VDD is formed between the power rail 222a and the source/drain region SD2 through the conductive via 216a and the gate-layer conductive line 208b, where the conductive via 216a and the gate-layer conductive line 208b are arranged within the odd-numbered track TK-3 and the conductive via 216a is directly below the power rail 222a. Referring to FIGS. 4F and 4G, each of the second biasing paths for supplying the second voltage VSS is formed between the power rail 262b and the source/drain region SD6 through the conductive via 252b, that is arranged within the even-numbered track TK-2 and directly below the power rail 262b, the conductive line 242f extending in the column direction in the conductive line layer L5, the conductive via 232g arranged in the conductive via layer L4, the conductive line 224b, the conductive via 218j arranged in the conductive via layer L2 and the gate-layer conductive line 208f.

Referring to FIG. 4G, the first biasing path for supplying the first voltage VDD is formed between the power rail 262a and the source/drain region SD2 through the conductive via 252a arranged within the even-numbered track TK-4 and directly below the power rail 262a, the conductive line 242g extending in the column direction in the conductive line layer L5 within the track TK-4, the conductive via 232a, the conductive line 226a, the conductive via 218a, and the gate-layer conductive line 208b.

Figure 5A:
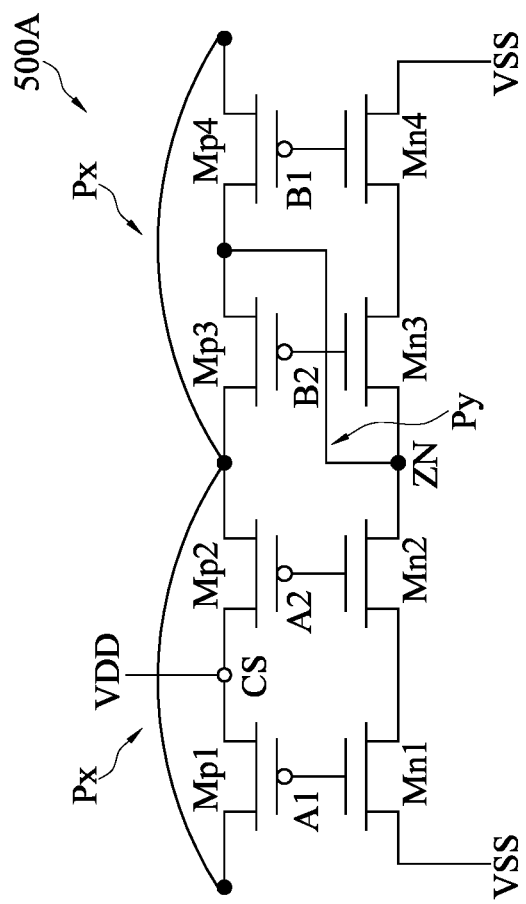
FIG. 5A is a circuit diagram of a semiconductor device, in accordance with some embodiments of the present disclosure.

FIG. 5A is a circuit diagram of a semiconductor device 500A, in accordance with some embodiments of the present disclosure. The semiconductor device 500A is a four-input And-Or-Inverter (AOI) device in the present embodiment. The semiconductor device 500A includes four P-type MOS device Mp1 through Mp4 and four N-type MOS device Mn1 through Mn4, in which four input nodes A1, A2, B1 and B2 is coupled to gate terminals of the corresponding MOS devices Mpx and Mnx (x=1-4), and an output node ZN is provided at a source/drain terminal shared by the N-type MOS devices Mn2 and Mn3 as shown in FIG. 5A. During operation, the semiconductor device 500A is biased to the first voltage VDD at a source/drain terminals shared by the P-type MOS devices Mp1 and Mp2, and biased to the second voltage VSS at a source/drain terminal of the N-type MOS device Mn1.

Figure 5B:
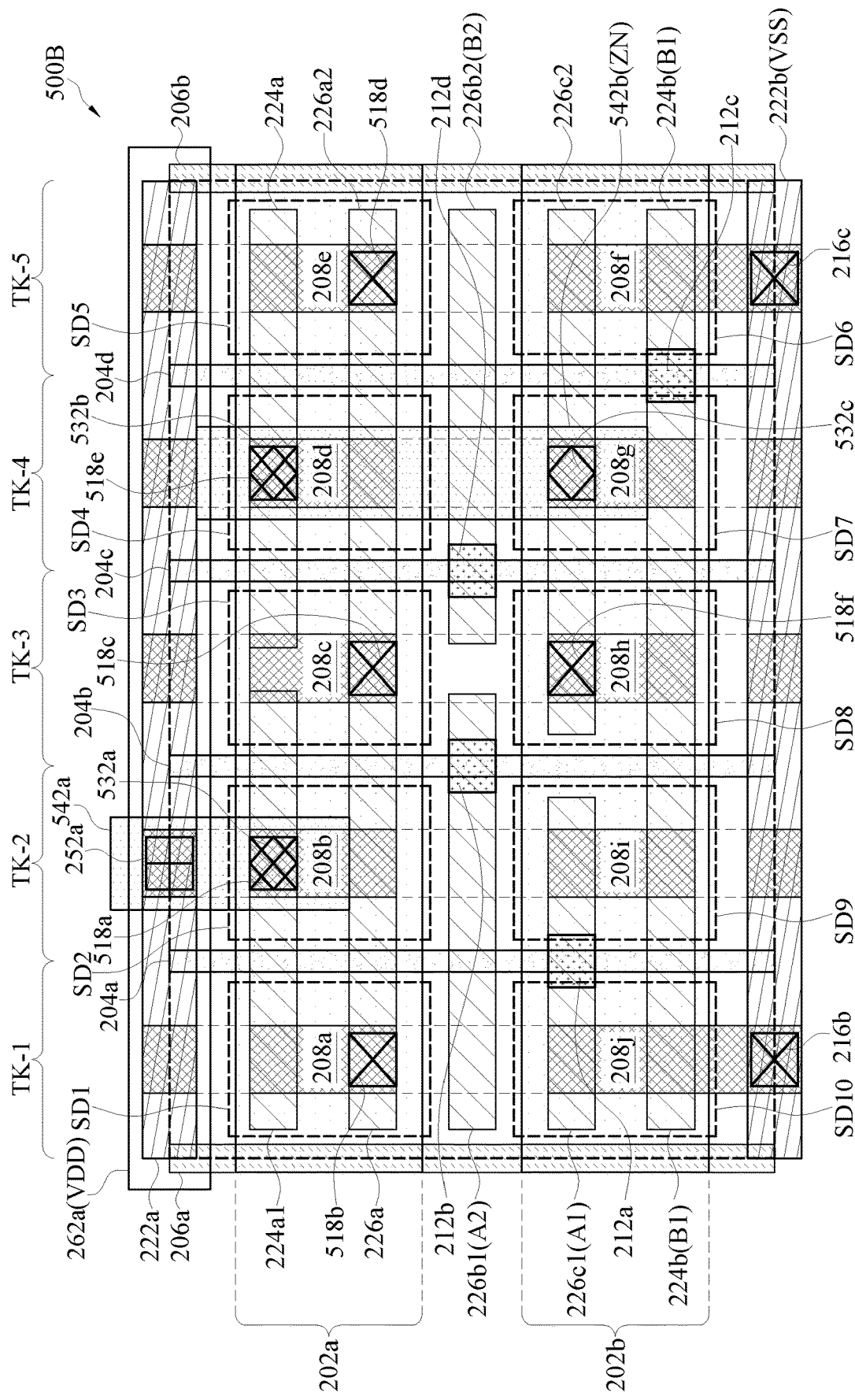
FIGS. 5B to 5G are design layouts of standard cells for the circuit diagram in FIG. 5A, in accordance with some embodiments of the present disclosure.
Figure 5C:
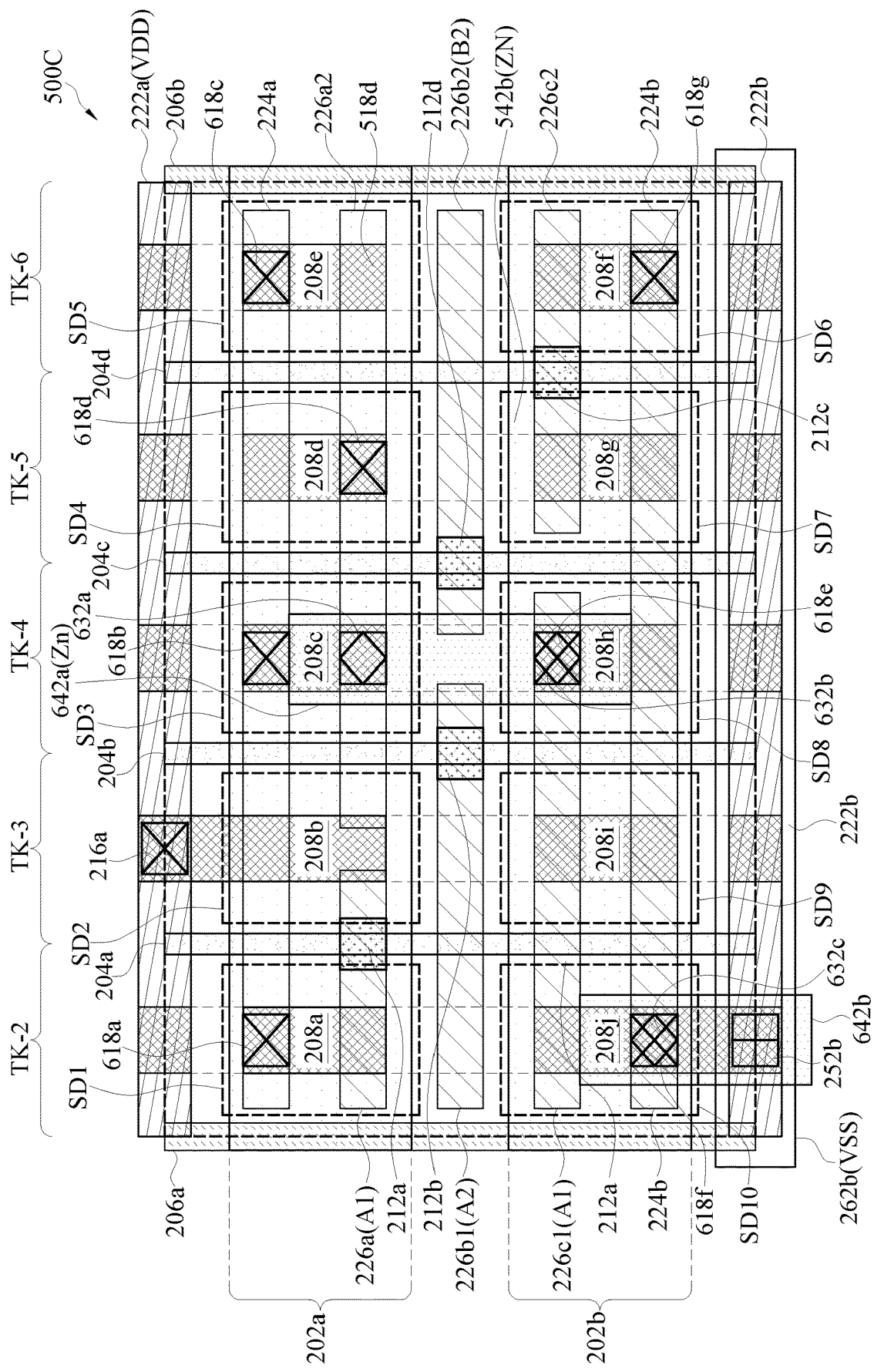
Figure 5D:
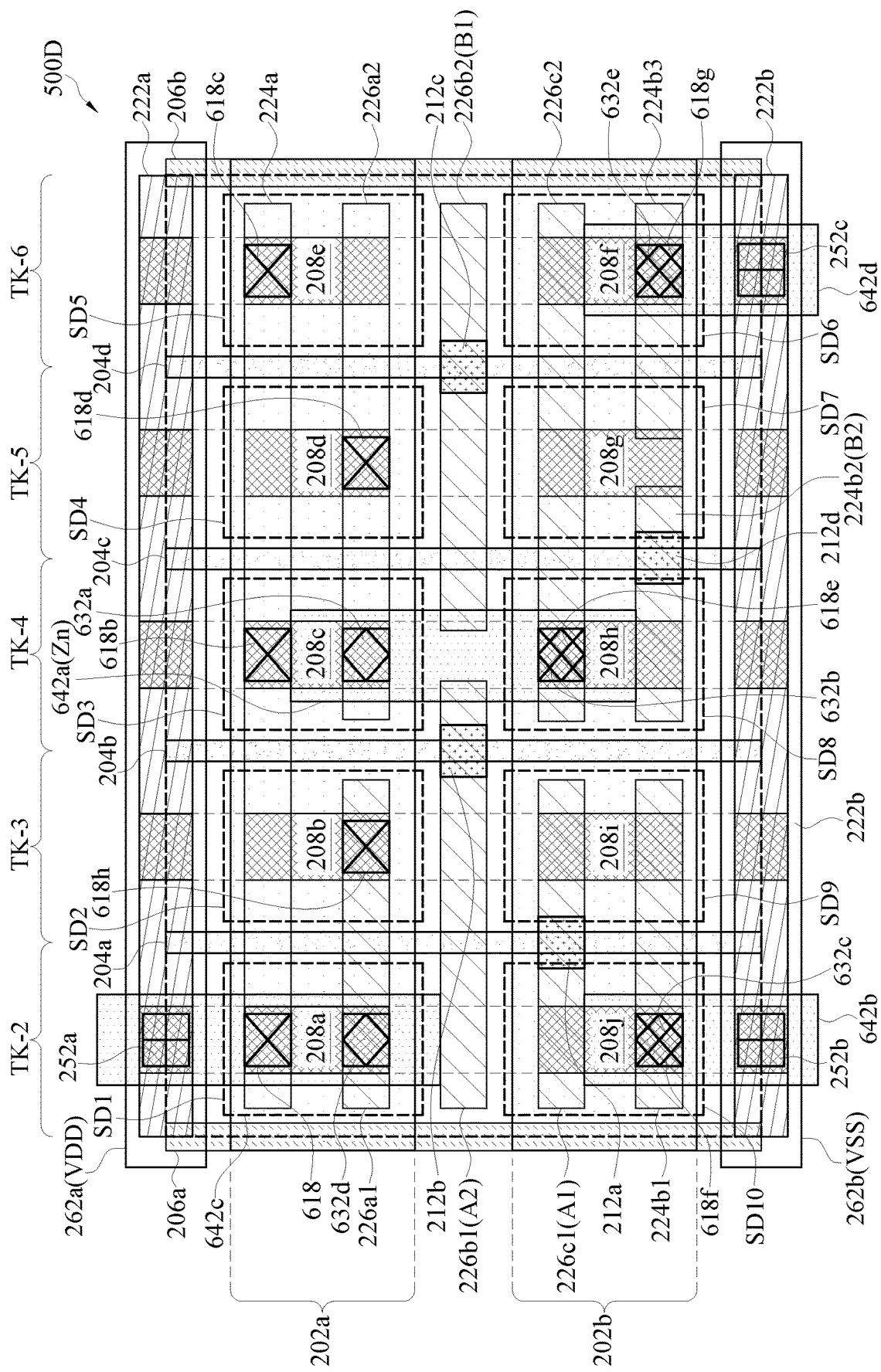

FIGS. 5B to 5D are design layouts of standard cells 500B, 500C and 500D, respectively, of the semiconductor device 500A, with different configurations. Each of the standard cells 500B to 500D includes two active regions 202a and 202b, four gate electrodes 204a, 204b, 204c and 204d, two cell-edge gate electrodes 206a and 206b, and ten source/drain regions SD1 through SD10 defined by the gate electrodes 204a through 204d and the cell-edge gate electrodes 206a and 206b. The standard cell 500B includes ten gate-layer conductive lines 208a through 208j directly over the respective active regions SD1 through SD10. Additionally, each of the standard cells 400B to 400D includes power rails 222 and conductive lines 224 and 226 in the conductive line layer L3. The materials and configurations of the above-mentioned features are similar to those described with reference to FIGS. 2A-2H, 3A, 3B, 4B to 4D, 4F and 4G, and thus their descriptions are omitted for brevity. At least one of the standard cells 500B to 500E include one of conductive vias 212, 214 and 216, 518 and 618 arranged in the conductive via layer L2, conductive vias 232 arranged in the conductive via L4 and conductive vias 252 arranged in the conductive via L6, details of which are provided in the following paragraphs.

The standard cell 500B has a track designation different from that of standard cells 500C and 500D. Referring to FIG. 5B, five tracks TK-1 through TK-5 are defined in which the source/drain regions SD1 and SD10 are arranged in the track TK-1, the source/drain regions SD2 and SD9 are arranged in the track TK-2, the source/drain regions SD3 and SD8 are arranged in the track TK-3, the source/drain regions SD4 and SD7 are arranged in the track TK-4, and the source/drain regions SD5 and SD6 are arranged in the track TK-5. In contrast, the tracks TK-1 through TK-5 are replaced by tracks TK-2 through TK-6, respectively, in the standard cells 500C and 500D.

Each of the standard cells 500B to 500D includes conductive vias 212a, 212b, 212c and 212d arranged for electrically connecting one of the gate electrodes 204 to one of the conductive lines 224 and 226, in which the conductive line 224 or 226 serves as an input pin and corresponds to one of the input nodes A1, A2, B1 and B2. For example, the conductive via 212a in the standard cell 500B electrically connects the gate electrode 204a to the conductive line 226c1, which serves as an input pin and corresponds to the input node A1 of the semiconductor device 500A.

Referring to FIGS. 5A and 5B, an electrical connection Px of FIG. 5A between the P-type MOS devices Mp1 through Mp4 of the semiconductor device 500A is implemented by an interconnection path of FIG. 5B between the source/drain regions SD1, SD3 and SD5 through the gate-layer conductive lines 208a, 208c and 208e, the conductive vias 518b, 518c and 518e arranged in the respective tracks TK-1, TK-3 and TK-5, and the conductive line 226a. An electrical connection Py of FIG. 5A between a common source/drain terminal of the P-type MOS devices Mp3 and Mp4 and a common source/drain terminal of the N-type MOS devices Mn2 and Mn3 is implemented by another interconnection path between the source/drain regions SD4 and SD8 through the gate-layer conductive line 208d, the conductive via 532b arranged in the track TK-4, the conductive line 542b extending in the column direction in the track TK-4, the conductive via 532c arranged in the track TK-4, the conductive line 226c2, and the conductive via 518f arranged in the track TK-3, in which the conductive line 542b serves as an output pin and corresponds to the output node ZN of FIG. 5A.

Referring to FIGS. 5A, 5C and 5D, the electrical connection Px is implemented by an interconnection path between the source/drain regions SD1, SD3 and SD5 through the gate-layer conductive lines 208a, 208c and 208e, the conductive vias 618b, 618c and 618e arranged in the respective tracks TK-2, TK-4 and TK-6, and the conductive line 224a. The electrical connection Py is implemented by another interconnection path between the source/drain regions SD4 and SD8 through the gate-layer conductive line 208d, the conductive via 618d arranged in the track TK-5, the conductive line 226a2, the conductive via 632a arranged in the track TK-4, the conductive line 642a, the conductive via 632b, the conductive line 226c1, and the conductive via 618e arranged in the track TK-4, in which the conductive line 642a serves as an output pin and corresponds to the output node ZN of FIG. 5A.

According to the design rule for the biasing paths involving the power rails 222 and 226, the first and second biasing paths are formed in response to the different designation of the tracks TK-1 through TK-6 in standard cells 500B to 500D. Referring to FIG. 5C, the first biasing path for supplying the first voltage VDD is formed between the power rail 222a and the source/drain region SD2 through the conductive via 216a and the gate-layer conductive line 208b, where the conductive via 216a and the gate-layer conductive line 208b are arranged within the odd-numbered track TK-3. Referring to FIG. 5B, the second biasing path for supplying the second voltage VSS is formed between the power rail 222b and the source/drain regions SD6 and SD10 through the respective conductive vias 216c and 216b and the respective gate-layer conductive lines 208f and 208j, where the conductive vias 216b and 216c and the gate-layer conductive lines 208j and 208f are arranged within the odd-numbered tracks TK-1 and TK-5, respectively.

Referring to FIG. 5B (or FIG. 5D), the first biasing path for supplying the first voltage VDD is formed between the power rail 262a and the source/drain region SD2 (or SD1) through the conductive via 252b arranged within the even-numbered track TK-2 and directly below the power rail 262b, the conductive line 542a (or 642c) extending in the column direction in the conductive line layer L5, the conductive via 532a (or 632d) arranged in the conductive via layer L4, the conductive line 224a1 (224a), the conductive via 518a (or 618a) arranged in the conductive via layer L2 and the gate-layer conductive line 208b (or 208a).

Referring to FIG. 5C, the second biasing path for supplying the second voltage VSS is formed between the power rail 262b and the source/drain regions SD10 and SD6 through the conductive via 252b arranged within the even-numbered track TK-2 and directly below the power rail 262b, the conductive line 642b extending in the column direction in the conductive line layer L5, the conductive via 632c arranged in the conductive via layer L4, the conductive line 224b, the conductive vias 618f and 618g arranged in the conductive via layer L2 and the gate-layer conductive lines 208j and 208f.

Referring to FIG. 5D, the second biasing path for supplying the second voltage VSS is formed between the power rail 262b and the source/drain regions SD10 and SD6 through the conductive vias 252b and 252c arranged within the even-numbered tracks TK-2 and TK-6 and directly below the power rail 262b, the respective conductive lines 642b and 642d extending in the column direction in the conductive line layer L5, the respective conductive vias 632c and 632e arranged in the conductive via layer L4, the respective conductive line 224b1 and 224b3, the respective conductive vias 618f and 618g arranged in the conductive via layer L2 and the respective gate-layer conductive lines 208j and 208f.

Figure 5E:
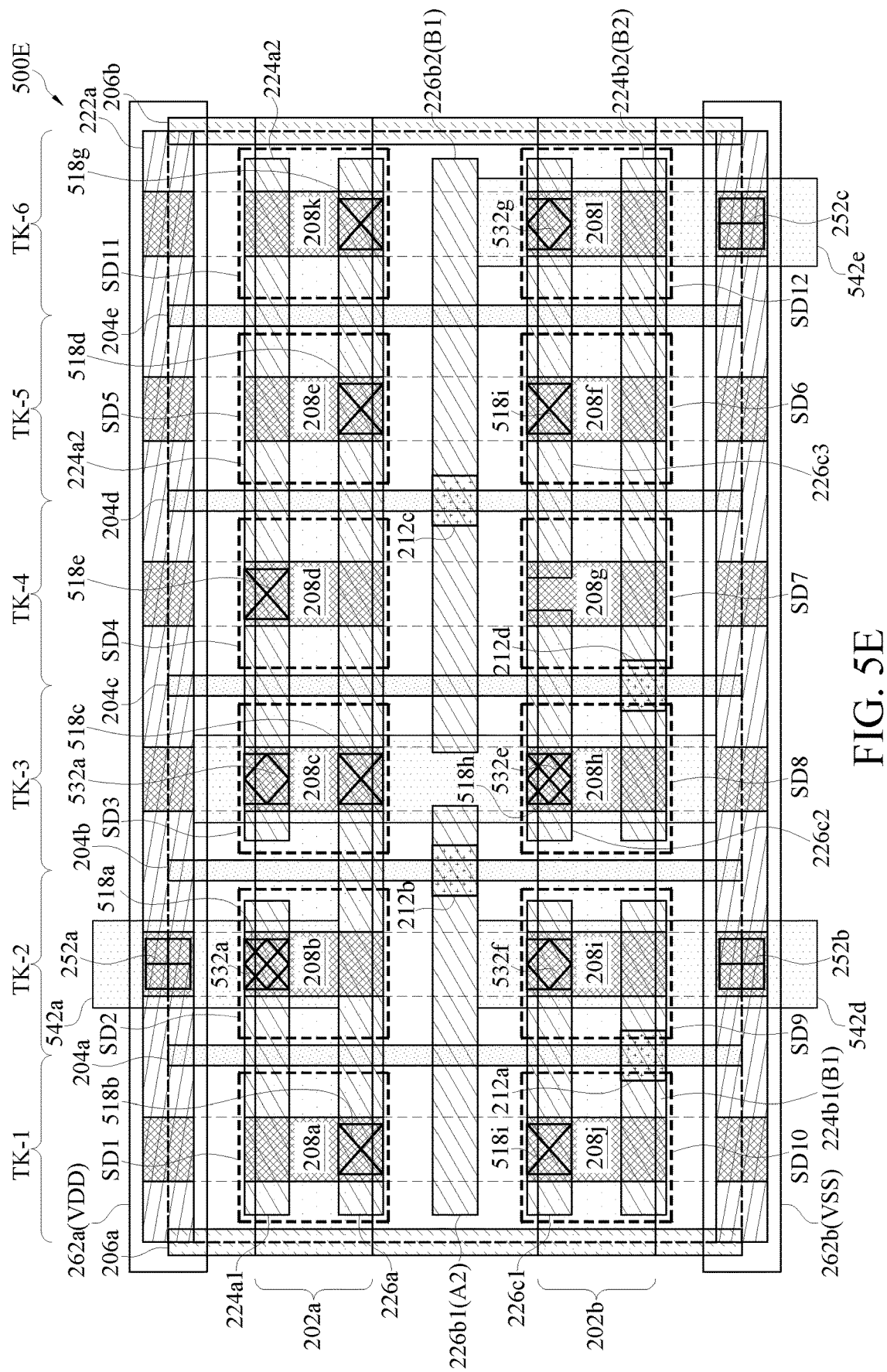

FIG. 5E is a design layout of a standard cell 500E of the semiconductor device 500A, in accordance with different configurations. The standard cell 500E is regarded as a variant of the standard cell 500B and differs from the standard cell 500B in that the power source of the second biasing path of the standard cell 500B for supplying the second voltage VSS is changed from the power rail 222b to the power rail 262b. Accordingly, to comply with the design rule for the power rail 262, the standard cells 500E includes an additional gate electrode 204e and an additional track TK-6 that includes additional source/drain regions SD11 and SD12 and gate-layer conductive lines 208k and 208l. The source/drain region SD11 is electrically connected to the source/drain region SD5 through the conductive via 518g and the conductive line 226a.

The second biasing path for supplying the second voltage VSS is formed between the power rail 262b and the source/drain regions SD10 and SD6 through the respective conductive vias 252b and 252c, that is arranged within the respective even-numbered tracks TK-2 and TK-6 and directly below the power rail 262b, through the respective conductive lines 542d and 542e extending in the column direction in the conductive line layer L5 within the respective tracks TK-2 and TK-6, the respective conductive vias 532f and 532g, the conductive lines 226c1 and 226c3, the respective conductive vias 518i and 518j within the respective track TK-1 and TK-5, and the respective gate-layer conductive lines 208j and 208f.

Figure 5F:
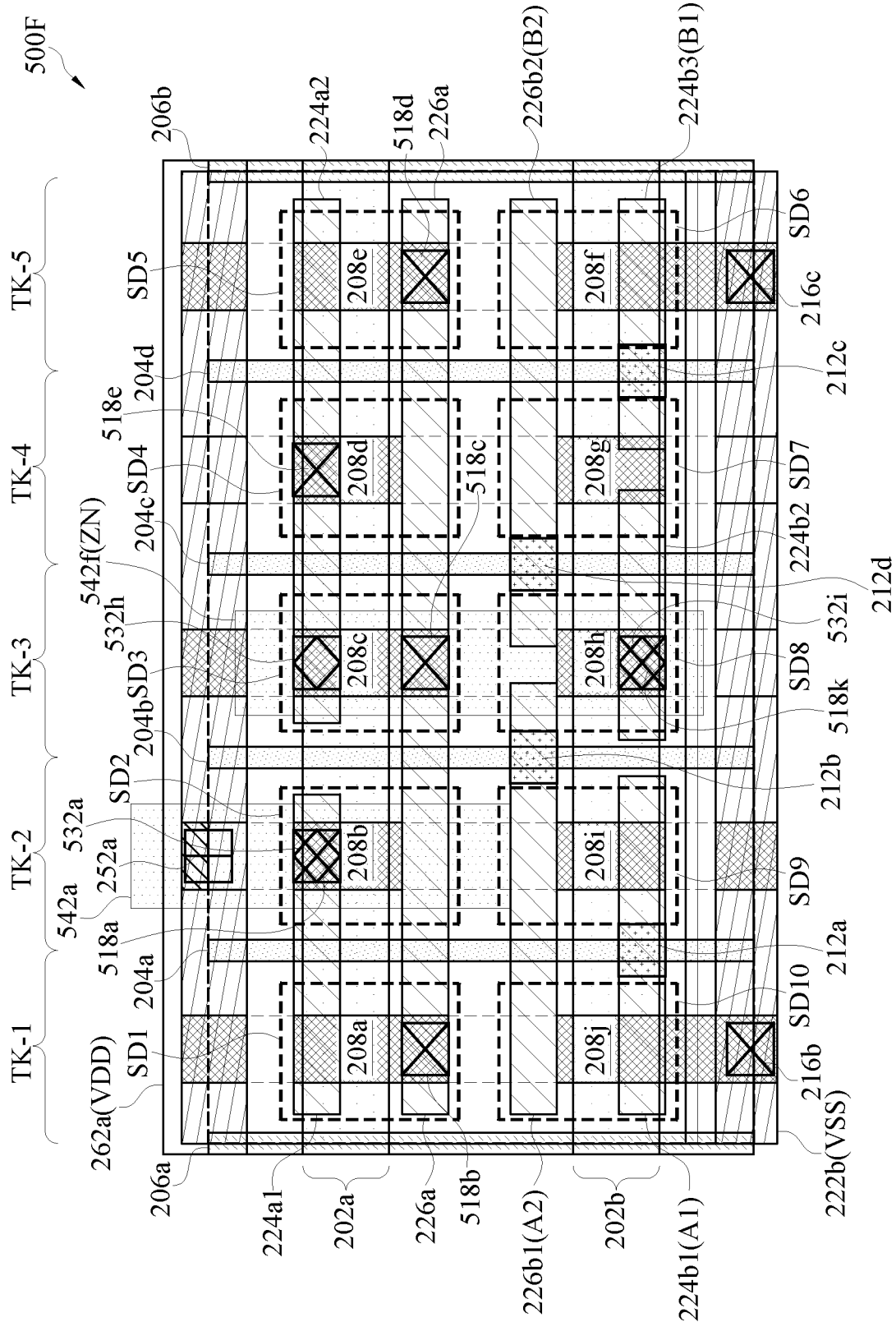
Figure 5G:
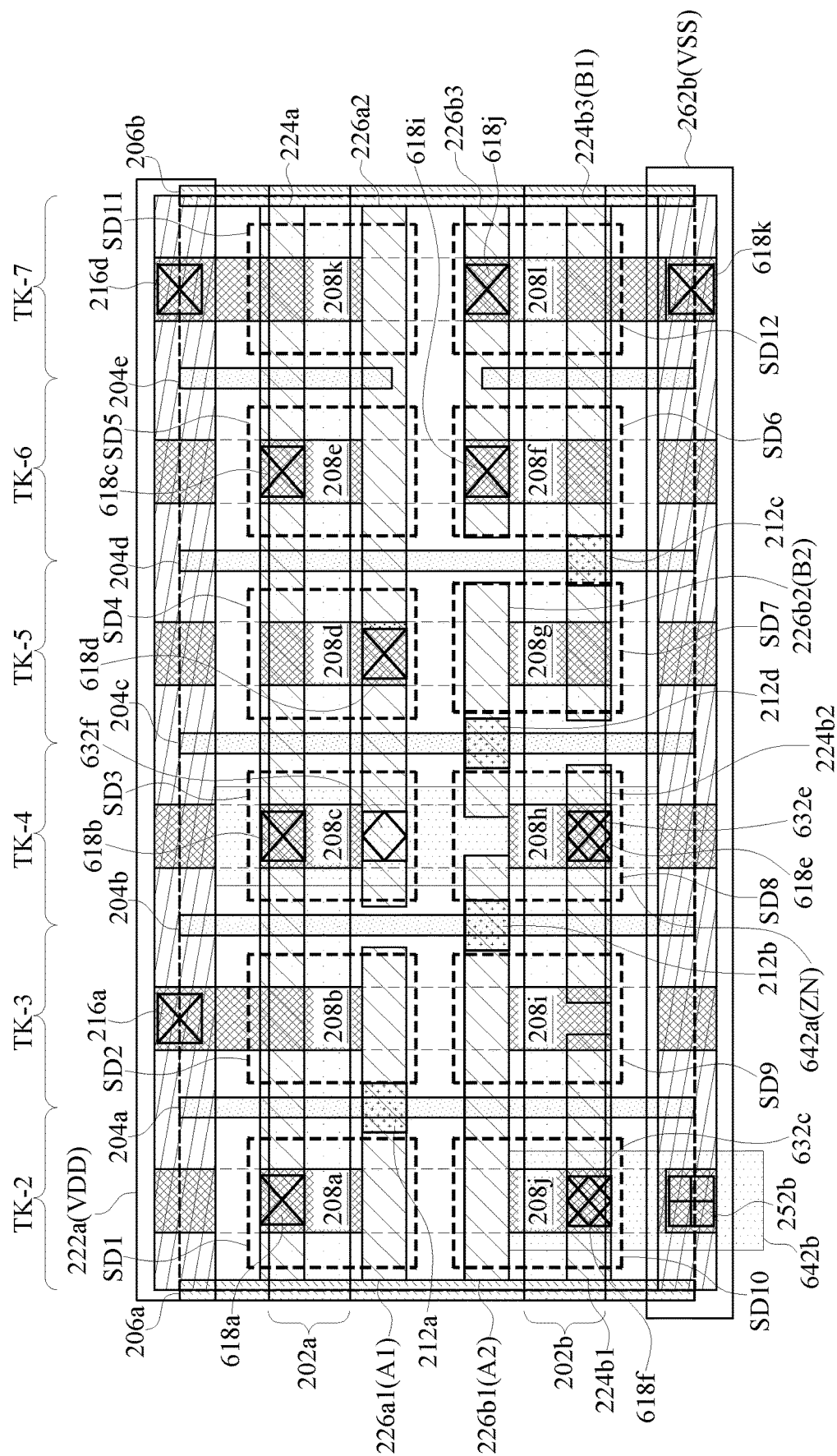

The layout embodiments illustrated above shows the standard cells with a cell height accommodating only five conductive lines (including the conductive lines 224 and 226) between the power rails 222a and 222b. However, these embodiments are provided for illustrative purposes. In some other embodiments, the standard cells having a cell height accommodating less than five conductive lines are also within the contemplated scope of the present disclosure. FIGS. 5F and 5G are design layouts of standard cells 500F and 500G, respectively, of the semiconductor device 500A, having four conductive lines, i.e., conductive lines 224a, 224b, 226a and 226b, between the power rails 222a and 222b.

The standard cell 500F is similar to the standard cell 500B, and a difference lies in the configuration of two conductive lines 226 of the standard cell 500F in contrast to the configuration of three conductive lines 226 of the standard cell 500B. To address the issue of limited routing space in the standard cell 500F, the conductive line 224b is further partitioned into conductive line 224b1, 224b2 and 224b3, and the conductive via 212c is rearranged to electrically connect the gate electrode 204d to the conductive line 224b3, which corresponds to the input node B1 of FIG. 5A. The electrical connection Py of FIG. 5A is alternatively implemented by yet another interconnection path between the source/drain regions SD4 and SD8 through the gate-layer conductive line 208d, the conductive via 518e, the conductive line 224a2, the conductive via 532h arranged in the track TK-3, the conductive line 542f extending in the column direction in the track TK-3, the conductive via 532i arranged in the track TK-3, the conductive line 224b2, and the conductive via 518k arranged in the track TK-3, in which the conductive line 542f serves as an output pin and corresponds to the output node ZN of FIG. 5A.

The standard cell 500G is similar to the standard cell 500C, and the differences lie in that the configuration of two conductive lines 226 of the standard cell 500G in contrast to the configuration of three conductive lines 226 of the standard cell 500B, and that, in an attempt to increase the routing space, the standard cell 500G includes an additional track TK-7 along with the gate electrode 204e, source/drain regions SD11 and SD12 and gate-layer conductive lines 208k and 208l. To address the issue of limited routing space in the standard cell 500G, the conductive line 224b is further partitioned into conductive line 224b1, 224b2 and 224b3, and the conductive line 226b is further partitioned into conductive line 226b1, 226b2 and 226b3. The conductive via 212c is rearranged to electrically connect the gate electrode 204d to the conductive line 224b3, which corresponds to the input node B1 of FIG. 5A, and The conductive via 212d is rearranged to electrically connect the gate electrode 204c to the conductive line 226b2, which corresponds to the input node B2 of FIG. 5A.

The electrical connection Py is implemented by yet another interconnection path between the source/drain regions SD4 and SD8 through the gate-layer conductive line 208d, the conductive via 618d arranged in the track TK-5, the conductive line 226a2, the conductive via 632f arranged in the track TK-4, the conductive line 642a in the track TK-4, the conductive via 632b, the conductive line 224b2, and the conductive via 618e arranged in the track TK-4, in which the conductive line 642a serves as an output pin and corresponds to the output node ZN of FIG. 5A.

Another first biasing path for supplying the first voltage VDD is formed between the power rail 222a and the source/drain SD11 through the conductive via 216d arranged in the track TK-7 and the gate-layer conductive line 208k. Another second biasing path for supplying the second voltage VSS is formed between the power rail 222b and the source/drain region SD6 through gate-layer conductive line 208f, the conductive via 618i arranged within the track TK-6 in the conductive via layer L2, the conductive line 226b3, the conductive via 618j arranged within the track TK-7, the gate-layer conductive line 208l and the conductive vias 618k arranged in the conductive via layer L2 and directly below the power rail 222b. This newly added second biasing path is formed in compliance with the design rule for the biasing path involving the power rail 222, i.e., the two adjacent conductive vias 618j and 618k are arranged within an odd-number track, e.g., track TK-7, and are spaced by at least two times the pitch pM0A or pM0B.

Figure 6:
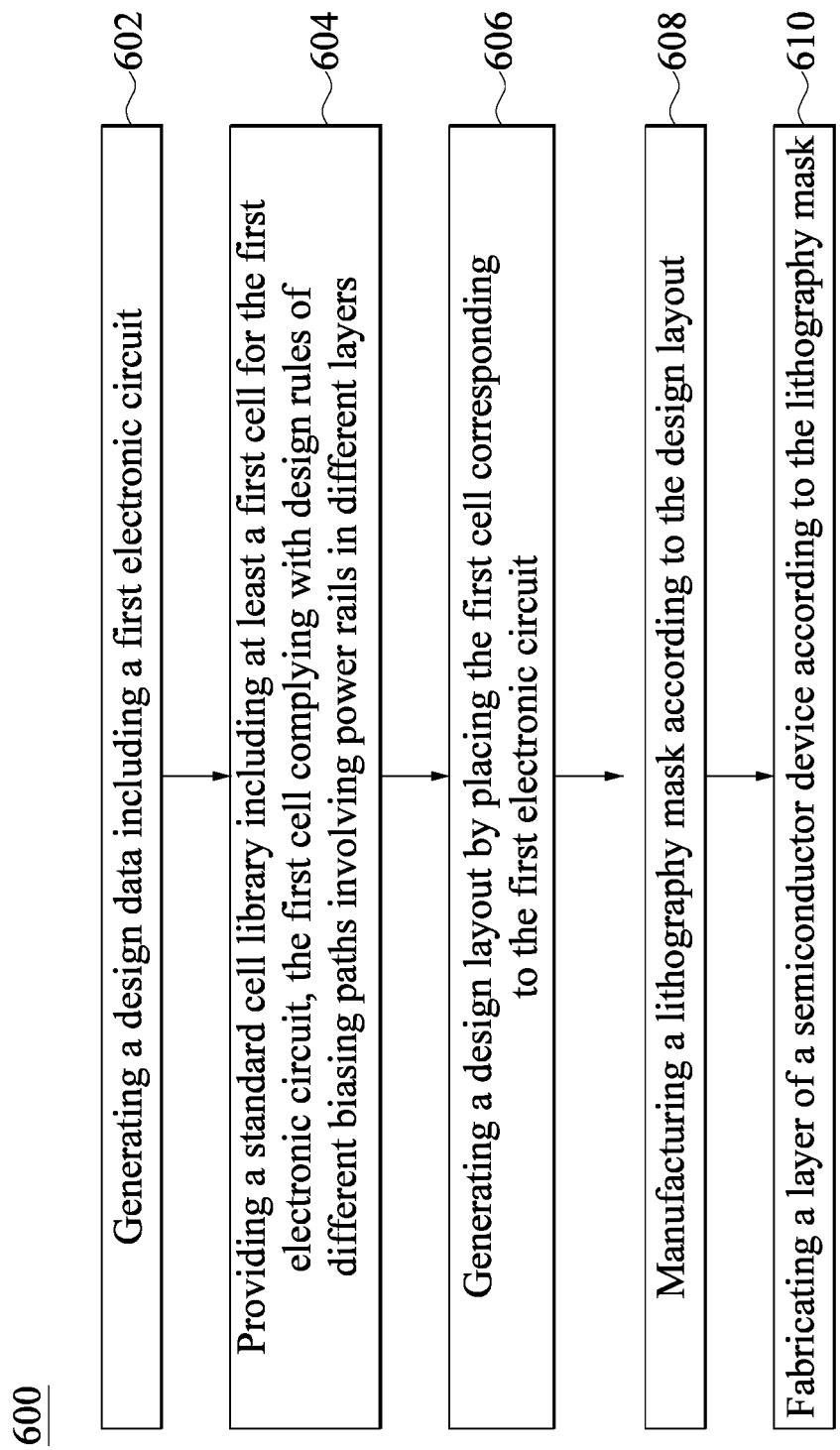
FIG. 6 is a flowchart of a layout method, in accordance with some embodiments of the present disclosure.

FIG. 6 is a flowchart of a layout method 600, in accordance with some embodiments of the present disclosure. It should be understood that additional steps can be provided before, during, and after the steps shown in FIG. 6, and some of the steps described below can be replaced or eliminated in other embodiments of the layout method 600. The order of the steps may be interchangeable.

At step 602, a design data is generated or received which includes a first electronic circuit. The design data may be represented as a netlist, a schematic diagram, a circuit diagram or the like. In some embodiments, the first electronic circuit is a logic gate device in various types, such as a NAND gate, an inverter gate, an XOR gate, an AND gate, a NOR gate, an AOI gate, or other suitable logic gate devices. In some embodiments, the design data in step 602 is generated during a synthesis stage of a design flow for manufacturing a semiconductor device.

At step 604, a standard cell library is provided which includes at least a first cell for the first electronic circuit, in which the first standard cell complies with design rules of different biasing paths involving power rails in different layers (e.g., an upper power rail and a lower power rail). In an embodiment, according to the design rule of the biasing paths involving the upper or lower power rails of the design layout, a source/drain region may have different biasing paths in the first cell and the second cell for implementing the same type electronic circuit. In an embodiment, according to the design rule of the biasing paths involving the upper or lower power rails of the design layout, different source/drain regions may have different biasing paths in the first cell. The details of the design rules for the different biasing paths associated with the upper and lower power rails are discussed previously, and are not repeated for brevity.

At step 606, a design layout is generated by placing the first second cell corresponding to the first electronic circuit. The step 606 may be performed during a placement and routing stage of a design flow for manufacturing a semiconductor device.

Figure 7:
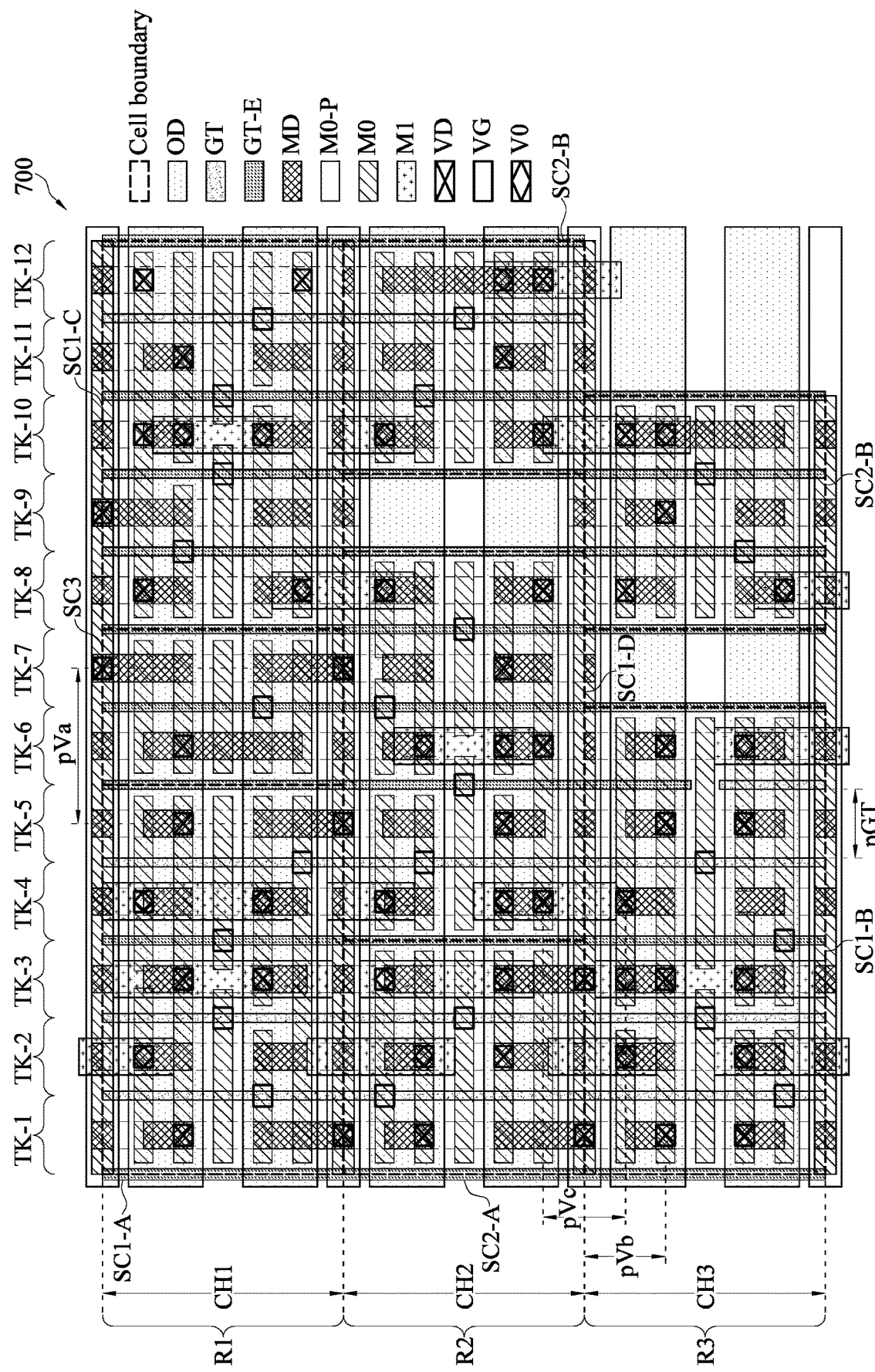
FIGS. 7 and 8 are design layouts of a semiconductor device, in accordance with some embodiments of the present disclosure.

FIG. 7 is a design layout 700 of a semiconductor device, in accordance with some embodiments of the present disclosure. The design layout 700 may be related to, part of, or a group of a semiconductor device, e.g., a MOS device, and can be implemented using a planar FET device, a FinFET device, a GAA device, a nanowire device, a FDSOI device, or the like.

The design layout 700 defines a plurality of rows, e.g., three rows R1, R2 and R3, extending in the row direction (along the x-axis). The rows R1, R2 and R3 have respective row heights CH1, CH2, and CH3 measured in the column direction. The row heights CH1, CH2 and CH3 may be equal to or different from one another.

Referring to steps 604 and 606 of FIG. 6, during a placement operation, a plurality of cells are selected from the cell library and placed in the design layout 700. The cells are shown with respective cell boundaries. Further, for the sake of clarity only part of the cell features are illustrated in FIG. 7, e.g., the gate electrodes (GT), cell-edge gate electrodes (GT-E), source/drain regions in the active region (OD), gate-layer conductive lines (MD), conductive vias (VG) electrically connected to gate electrodes, conductive vias (VD) electrically connected to the gate-layer conductive lines, conductive lines (M0) and power rails (M0-P) in the conductive line layer L3, and conductive lines (M1) in the conductive line layer L5. Twelve tracks TK-1 through TK-12 are defined by the gate electrodes and the cell-edge gate electrodes. As discussed previously, the design layout of each cell is provided along with designation of odd numbers or even numbers for each track in the respective cell. Accordingly, the cells are placed and aligned with the designations of the odd-numbered tracks and even-numbered tracks given in the design layout 700.

Each of the cells in the design layout 700 may have a cell height measured in the column direction equal to a row height of the row at which the standard cell resides. In some other embodiments, the cell in the design layout 300 may have a cell height equal to a sum of row heights of contiguous rows, e.g., CH1+CH2. In some embodiments, the cells may have equal or different lengths in the row direction. The cells may abut one another or are spaced from one another.

Four first-type cells SC1, including cells SC1-A, SC1-B, SC1-C and SC1-D, are provided. In some embodiments, the first-type cells SC1-A through SC1-D are configured to implement an AOI gate device with layout configurations corresponding to standard cells 500B, 500E, 500C and 500D, respectively. Three second-type cells SC2, including standard cells SC2-A and SC2-B, are provided. In some embodiments, the second-type cells SC2-A and SC2-B are configured to implement a NAND gate device with layout configurations corresponding to standard cells 400C and 400G, respectively. A third-type cell SC3 is also provided. In some embodiments, the second-type cell SC3 is configured to implement an inverter device with a layout configuration corresponding to standard cell 200E.

The design layout 700 designates odd-numbered tracks and even-number tracks, e.g., tracks TK-1 through TK-12. When the cells are to be placed in the design layout 700, the odd-numbered tracks and even-numbered tracks of each cell fit into the tracks with odd numbers and even numbers, respectively. For example, the cell SCA-1 is placed with the tracks TK-1 through TK-5 of the standard cell 500B fitting into track TK-1 through TK5 in row R1 of the design layout 700. The cell SC3 is place with its tracks TK-2 and TK-1 fitting into tracks TK-6 and TK-7 in row R1 of the design layout 700.

The proposed cell library provides cells with different layouts, including various biasing paths, and different track designations of each cell. This arrangement may increase the power rail routing efficiency for cells with reduced cell heights while reducing routing violation when cells are abutted in the design layout. For example, through the arrangement of providing different cell layouts for a same type electronic circuit, in which the bias paths are provided for the different power rails, the design layout 700 can be implemented by choosing suitable cells out of the plurality of cells for a certain type of electronic circuit under the design rule regarding the abutting cells. Further, since the odd-numbered and even-numbered tracks of each cell are fit into odd-numbered and even-numbered tracks the design layout 700, the biasing path of even-numbered tracks will not interfere with the biasing path of odd-numbered tracks for adjacent cells sharing the same power rails. Thus, the collision of the power rails between adjacent cells can be effectively mitigated or reduced. As a result, the cells can be placed more closely due to the flexibility of the biasing paths of abutting cells. The area of margins spared for arranging adjacent and incompatible cells can also be reduced.

In some embodiments, through the introduction of the design rule of the biasing path for the lower power rail (M0-P) arranged in the conductive line L3, the drain vias (VD) arranged in the conductive via layer L1 and directly below the power rails (M0-P) in the conductive line layer L3 are allowed to be present in the odd-numbered tracks only. As a result, a pitch pVa of the drain vias (VD) in the row direction is at least twice the pitch pGT of the gate electrodes (GT). In some embodiments, through the introduction of the design rule of the biasing path for the lower power rail (M0-P), the drain vias (VD) arranged in the conductive via layer L1 and within the odd-numbered tracks are not allowed to be aligned with or directly below the conductive lines (M0) immediately adjacent to these power rails (M0-P). As a result, a pitch pVb of the drain vias (VD) in the column direction within the odd-numbered track is at least twice the pitch pM0A between the power rail (M0-P) and the conductive line (M0) or twice the pitch pM0B between the conductive lines (M0). Further, since drain vias (VD) are not allowed to be aligned with the lower power rail (M0-P) within the even-numbered track, a pitch pVc of the drain vias (VD) in the column direction within the even-numbered track is at least twice the pitch pM0A between the power rail (M0-P) and the conductive line (M0) or twice the pitch pM0B between the conductive lines (M0). Accordingly, the via pitch of the conductive vias (VD) in the column direction is effectively enlarged for either the odd-numbered and even-numbered tracks regardless whether the adjacent conductive vias are within the same standard cell or from adjacent standard cells.

Referring to FIG. 6, at step 608, a lithography mask is manufactured according to the design layout. At step 610, a semiconductor device fabricated in which a layer of the semiconductor device is formed according to the lithography mask. In some embodiments, the semiconductor device is fabricated according to the design layout.

Figure 8:
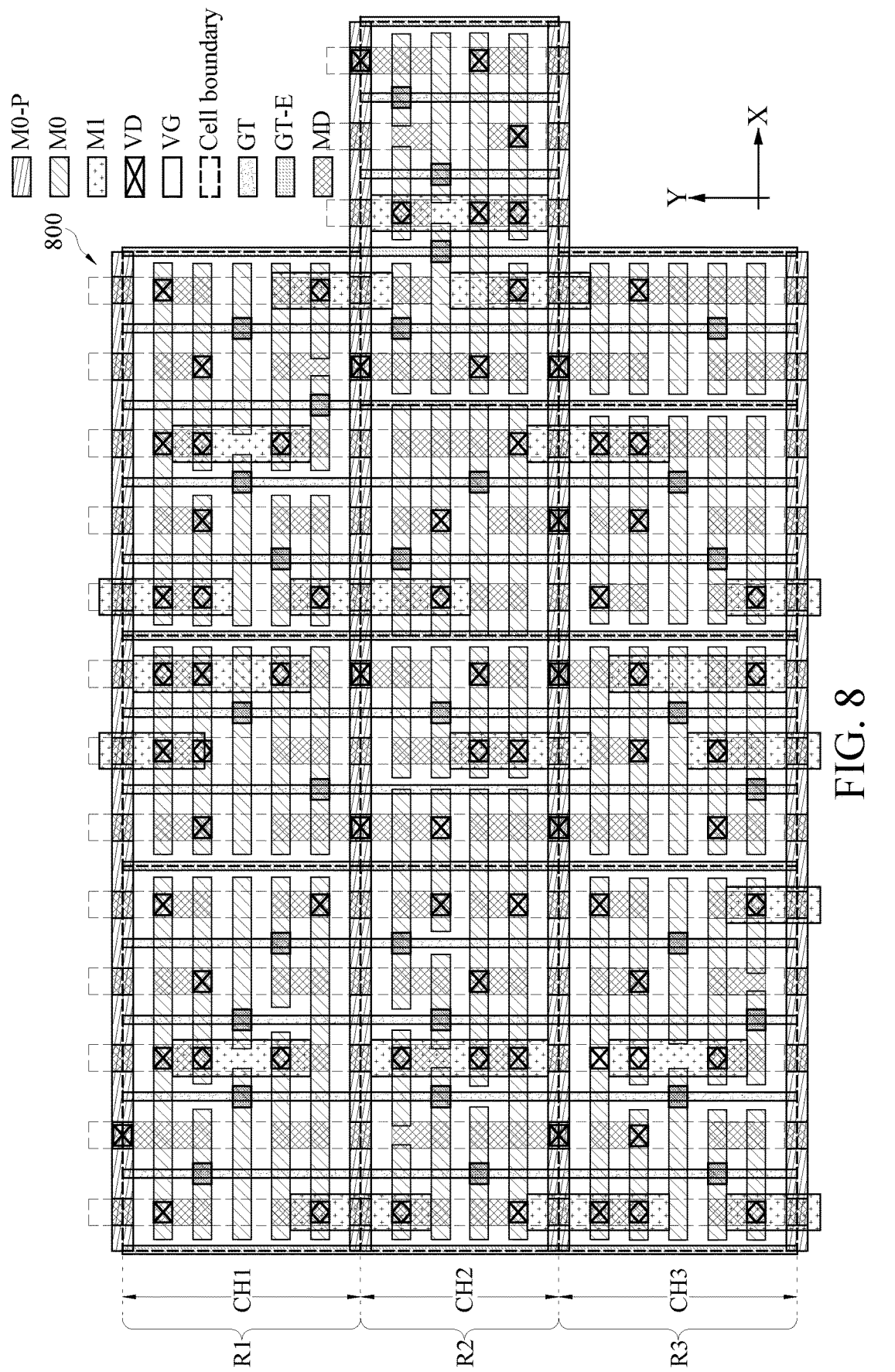

The design layout 700 is generated with a configuration of a constant row height. FIG. 8 is a design layout 800 of a semiconductor device, in accordance with some embodiments of the present disclosure. The design layout 800 includes a plurality of rows, e.g., three rows R1, R2 and R3, extending in the row direction. The rows R1, R2 and R3 have respective row heights CH1, CH2, and CH3 measured in the column direction. The row height CH2 of the second row is less than the row height CH1 and CH3. In some embodiments, the cells in the row R1 or R3 includes five conductive lines (M0) between the adjacent power rails (M0-P), which feature is also illustrated in the standard cells 200A to 200H, 400B to 400D, 400F, 400G and 500B to 500E. The cells in the row R2 may include four conductive lines (M0), thereby leading to a cell height CH2 less than the cell height CH1 or CH3.

Figure 9:
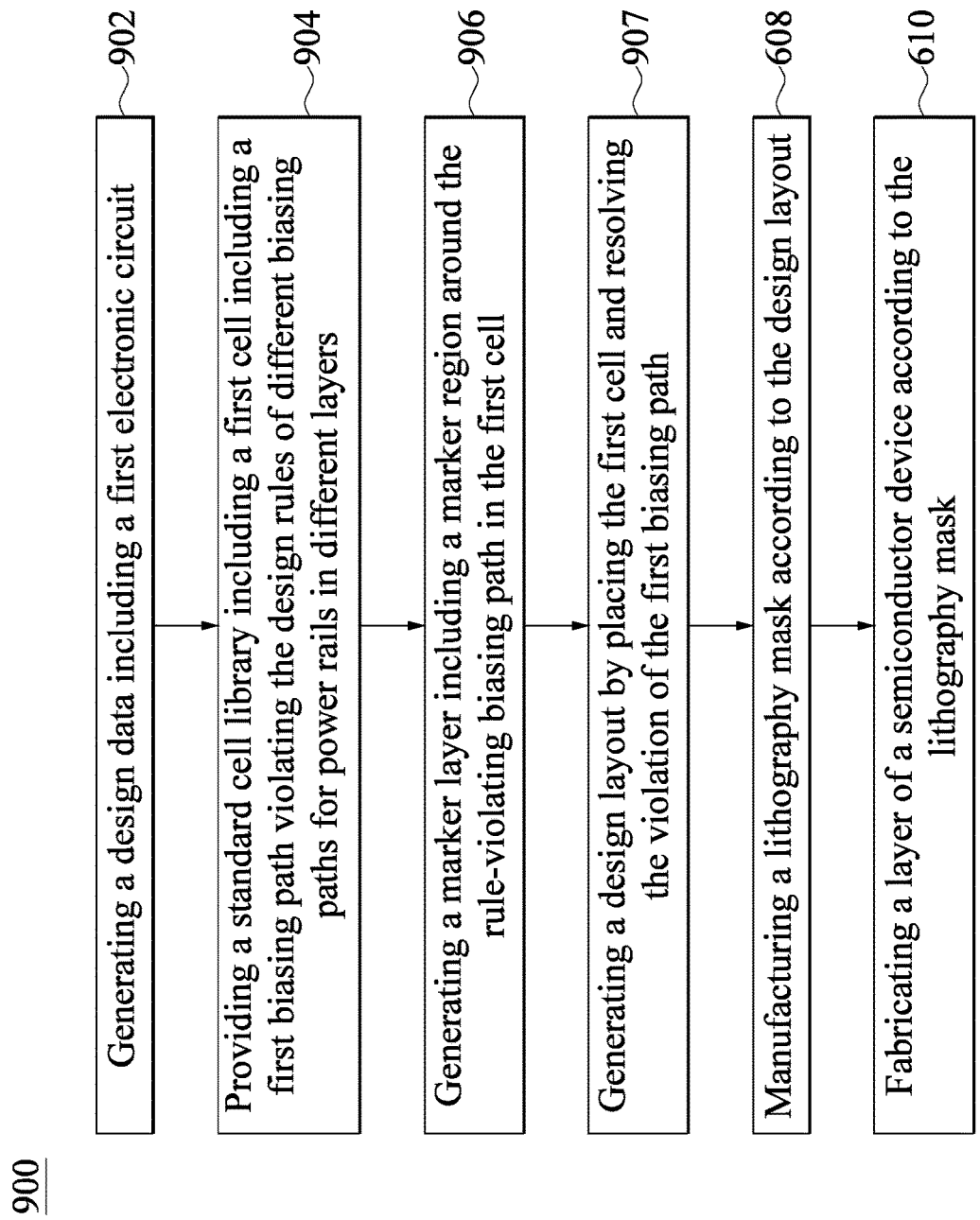
FIG. 9 is a flowchart of a layout method, in accordance with some embodiments of the present disclosure.

FIG. 9 is a flowchart of a layout method 900, in accordance with some embodiments of the present disclosure. It should be understood that additional steps can be provided before, during, and after the steps shown in FIG. 9, and some of the steps described below can be replaced or eliminated in other embodiments of the layout method 900. The order of the steps may be interchangeable.

Figure 10:
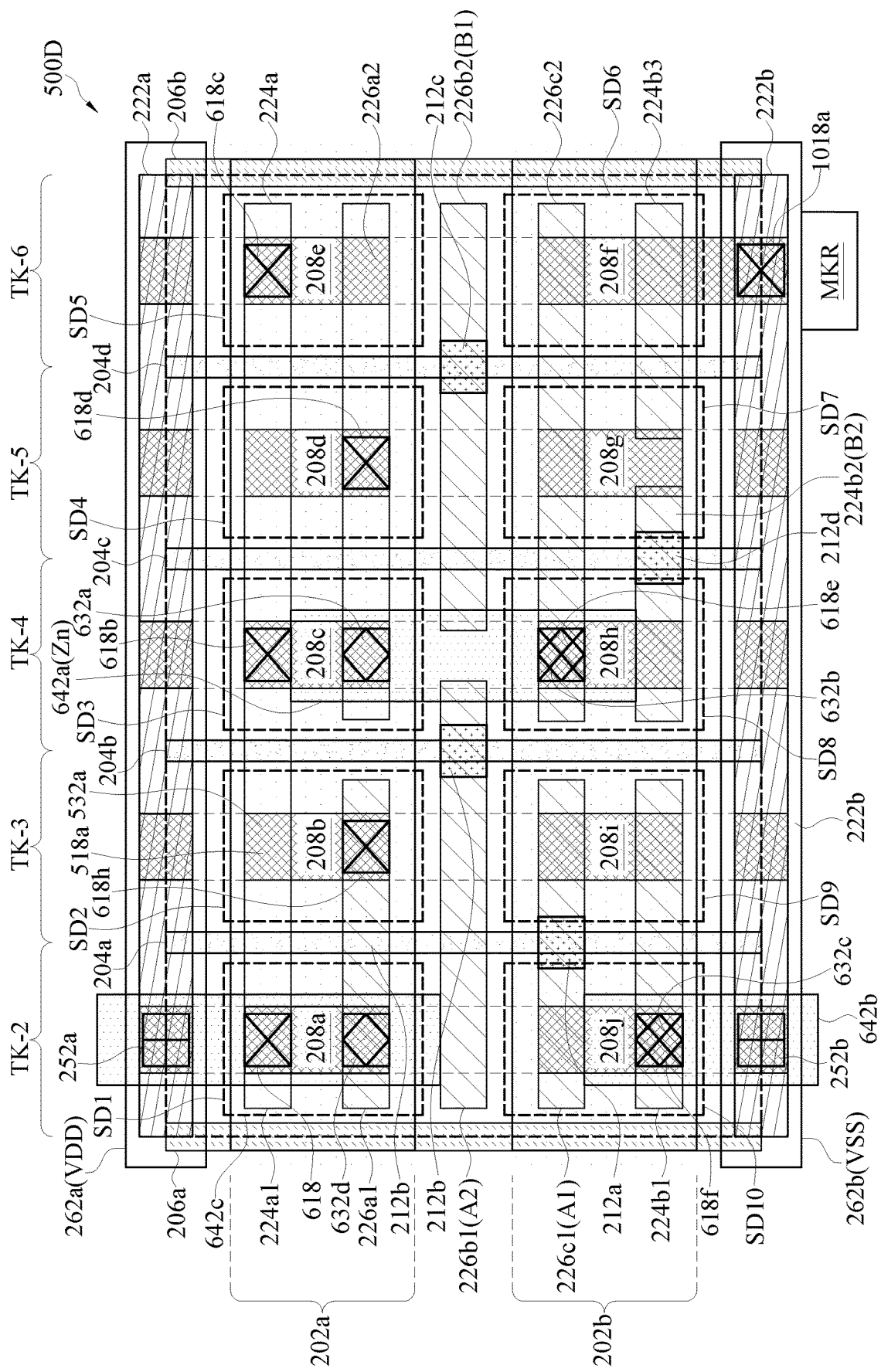
FIG. 10 is a design layout of a standard cell for the circuit diagram in FIG. 5A, in accordance with some embodiments of the present disclosure.

At step 902, a design data is generated including a first electronic circuit. At step 904, a standard cell library is provided including a first cell including a first biasing path violating design rules of different biasing paths for power rails in different layers. FIG. 10 shows a design layout of a standard cell 1000, which is similar to the standard cell 500D shown in FIG. 5D, except for the biasing path between the second voltage VSS and the source/drain region SD6. In some cases, the source/drain region SD6 is electrically connected to the power rail 222b through the gate-layer conductive line 208f and the conductive via 1018a, which arrangement violates the design rule of the biasing paths for the power rails in different layers in contrast to the otherwise compliant design layout shown in FIG. 5D.

At step 906, a marker layer is generated in the standard cell 1000 in which the marker layer is overlaid with the remaining layers of the standard cell 1000 and includes a marker region MKR around the rule-violating conductive via 1018a of the rule-violating biasing path.

Figure 11:
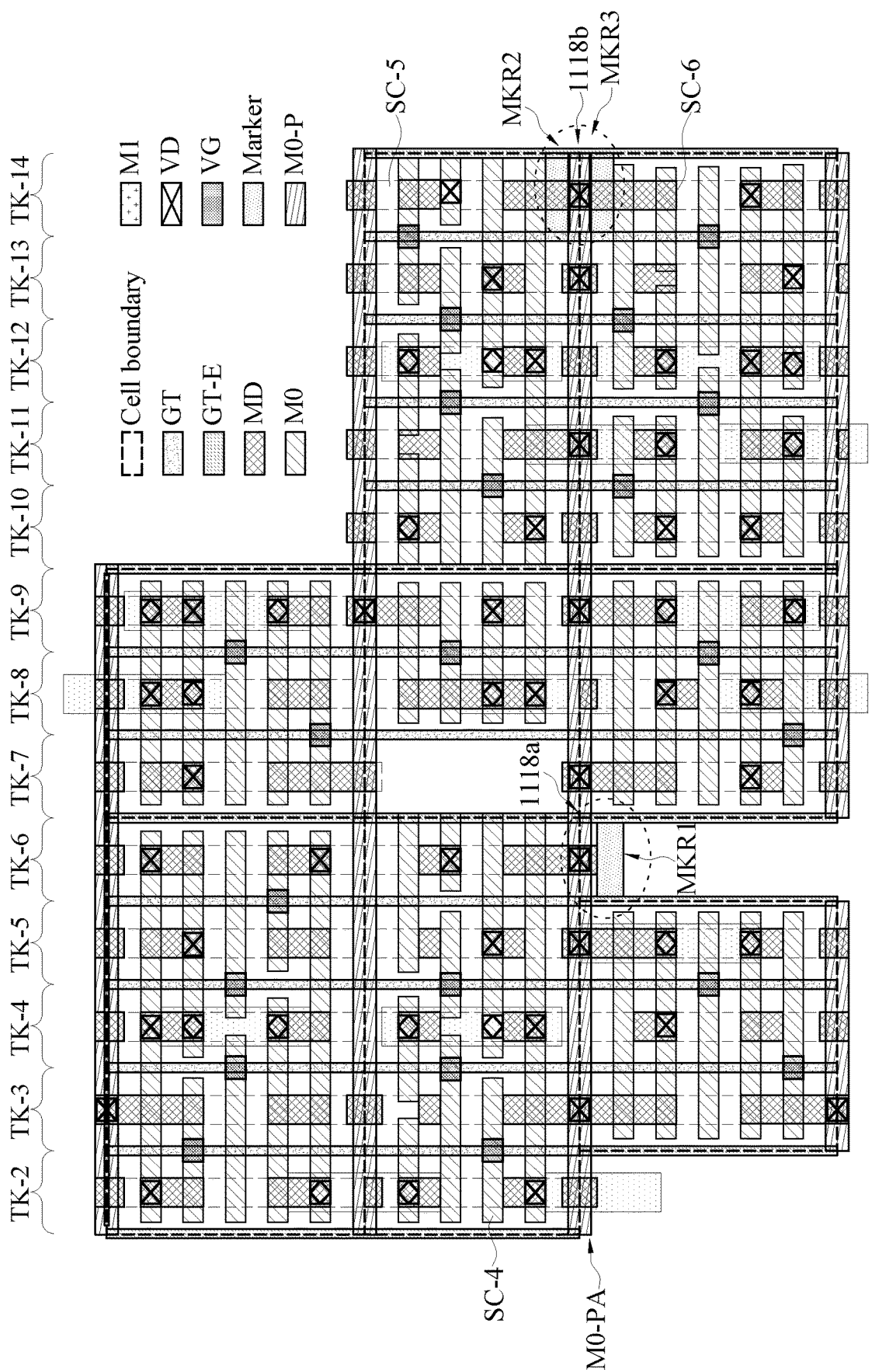
FIG. 11 is a design layout of a semiconductor device, in accordance with some embodiments of the present disclosure.

At step 907, a design layout is generated by placing the first cell and resolving the violation of the rule-violating biasing path. FIG. 11 shows a design layout 1100, in accordance with some embodiments. The design layout 1100 includes a plurality of standard cells, and three exemplified standard cells SC4, SC5 and SC6 are marked with respective cell boundaries. The standard cell SC4 includes a conductive via 1118a arranged in the even-numbered track TK-6 and directly below a power rail M0-PA. A first marker layer including a marker region MKR1 is generated around the conductive via 1118a. Similarly, each of the standard cells SC5 and SC6 includes a conductive via 1118b arranged in the even-numbered track TK-12 and directly below the power rail M0-PA. A second marker layer is also generated in each of the standard cells SC5 and SC6 and includes marker regions MKR 2 and MKR3, respectively, around the respective conductive vias 1118b in the respective standard cells SC5 and SC6.

In some embodiments, in an effort to resolve the violating of the conductive via 1118a, all of the functional cells in the design layout 1100 that abut the standard cell SC4 are offset from the track TK-6 on a side of the power rail M0-PA where the conductive via 1118a is disposed. In other words, the track TK-6 is cleared of functional cells in the track TK-6 on a side of the power rail M0-PA around the conductive via 1118*a*.

In some embodiments, in an effort to resolve the violation of the conductive vias 1118*b*, the standard cells SC5 and SC6 are arranged to abut each other and share the conductive via 1118*b*. Through this exceptional treatment of the standard cells SC5 and SC6 for the biasing path by the power rail M0-PA through the conductive via 118*b* in the even-numbered track TK-12, the utilization of cell placement can be enhanced.

The steps 608 and 610 are performed in a manner similar to those described with reference to the layout method 600, and their descriptions are omitted for brevity.

Figure 12A:
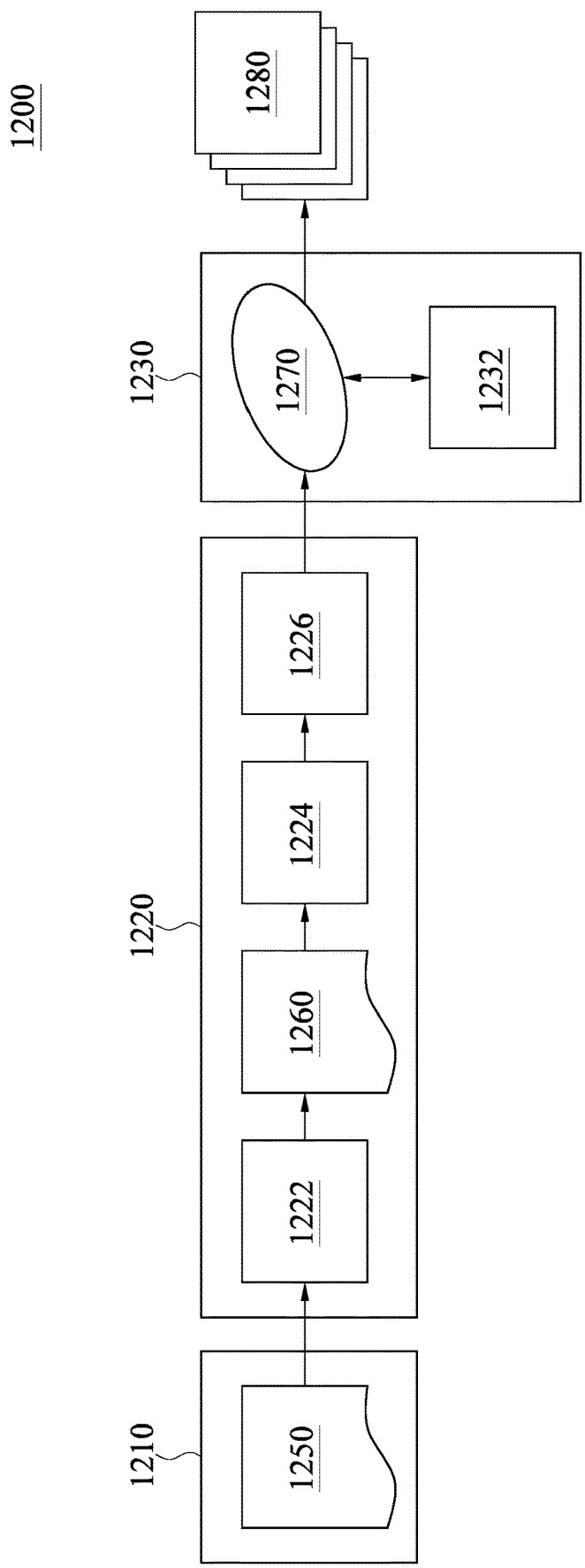
FIG. 12A is a schematic diagram showing an integrated circuit (IC) manufacturing system, in accordance with some embodiments.

FIG. 12A is a schematic diagram 1200 showing an integrated circuit (IC) manufacturing system, in accordance with some embodiments. The IC manufacturing system 1200 is configured to manufacture an IC device 1280 through a plurality of entities, such as a design subsystem 1210, a mask subsystem 1220, and a fabrication subsystem 1230. The entities in the IC manufacturing system 1200 may be linked by a communication channel, e.g., a wired or wireless channel, and interact with one another through a network, e.g., an intranet or the internet. In an embodiment, the design subsystem 1210, the mask subsystem 1220 and the fabrication subsystem 1230 belong to a single entity, or are operated by independent parties.

The design subsystem (design house or layout design provider) 1210 generates a design layout 1250 in a design phase for the IC devices 1280 to be fabricated. The design subsystem 1210 may perform the layout methods discussed in the present disclosure to generate the design layout 1250, e.g., the design layouts shown with reference to the figures of the present disclosure. In an embodiment, the design subsystem 1210 operates a circuit design procedure to generate the design layout 1250. The design subsystem 1210 may include further one or more steps, such as logic design, physical design, pre-layout simulation, placement and routing, timing analysis, parameter extraction, design rule check and post-layout simulation, to generate the design layout 1250. The design layout 1250 may be converted from description texts into their visual equivalents to show a physical layout of the depicted patterns, such as the dimensions, shapes and locations thereof. In an embodiment, the design layout 1250 can be expressed in a suitable file format such as GDSII, DFII, OASIS, or the like.

The mask subsystem 1220 receives the design layout 1250 from the design subsystem 1210 and manufactures one or more masks (photomask, lithography masks or reticles) according to the design layout 1250. In an embodiment, the mask subsystem 1220 includes a mask data preparation block 1222, a mask fabrication block 1224 and a mask inspection block 1226. The mask data preparation block 1222 modifies the design layout 1250 so that a revised design layout 1260 can allow a mask writer to transfer the design layout 1250 to a writer-readable format.

The mask fabrication block 1224 is configured to fabricate the mask by preparing a substrate based on the design layout 1260 provided by the mask data preparation block 1222. A mask substrate is exposed to a radiation beam, such as an electron beam, based on the pattern of the design layout 1260 in a writing operation, which may be followed by an etching operation to leave behind the patterns corresponding to the design layout 1260. In an embodiment, the mask fabrication block 1224 includes a checking procedure to ensure that the layout data 1260 complies with requirements of a mask writer and/or a mask manufacturer to generate the mask as desired. An electron-beam (e-beam), multiple e-beams, an ion beam, a laser beam or other suitable writer source may be used to transfer the patterns.

After the lithography mask is fabricated, the mask inspection block 1226 inspects the fabricated mask to determine if any defects, such as full-height and non-full-height defects, exist in the fabricated mask. If any defects are detected, the mask may be cleaned or the design layout in the mask may be modified.

The fabrication subsystem 1230 is an IC manufacturing entity that includes multiple manufacturing facilities or tools for the fabrication of a variety of the IC devices 1280. The fabrication subsystem 1230 uses the mask fabricated by the mask subsystem 1220 to fabricate a wafer 1270 having a plurality of IC devices 1280 thereon. The wafer 1270 includes a semiconductor substrate and optionally various layers formed thereon. The operations provided by the manufacturing facilities or tools may include, but not limited to, photolithography, deposition, sputtering, etching, diffusion, ion implantation and annealing. In some embodiments, test structures may be formed on the wafer 1270 to generate test data indicative of the quality of the fabricated wafer 1270. In an embodiment, the fabrication subsystem 1230 includes a wafer testing block 1232 configured to ensure that the wafer 1270 conforms to physical manufacturing specifications and mechanical and/or electrical performance specifications. After the wafer 1270 passes the testing procedure performed by the wafer testing block 1232, the wafer 1270 may be diced (or sliced) along the scribe line regions to form separate IC devices 1280. The dicing process can be accomplished by scribing and breaking, by mechanical sawing (e.g., with a dicing saw) or by laser cutting.

Figure 12B:
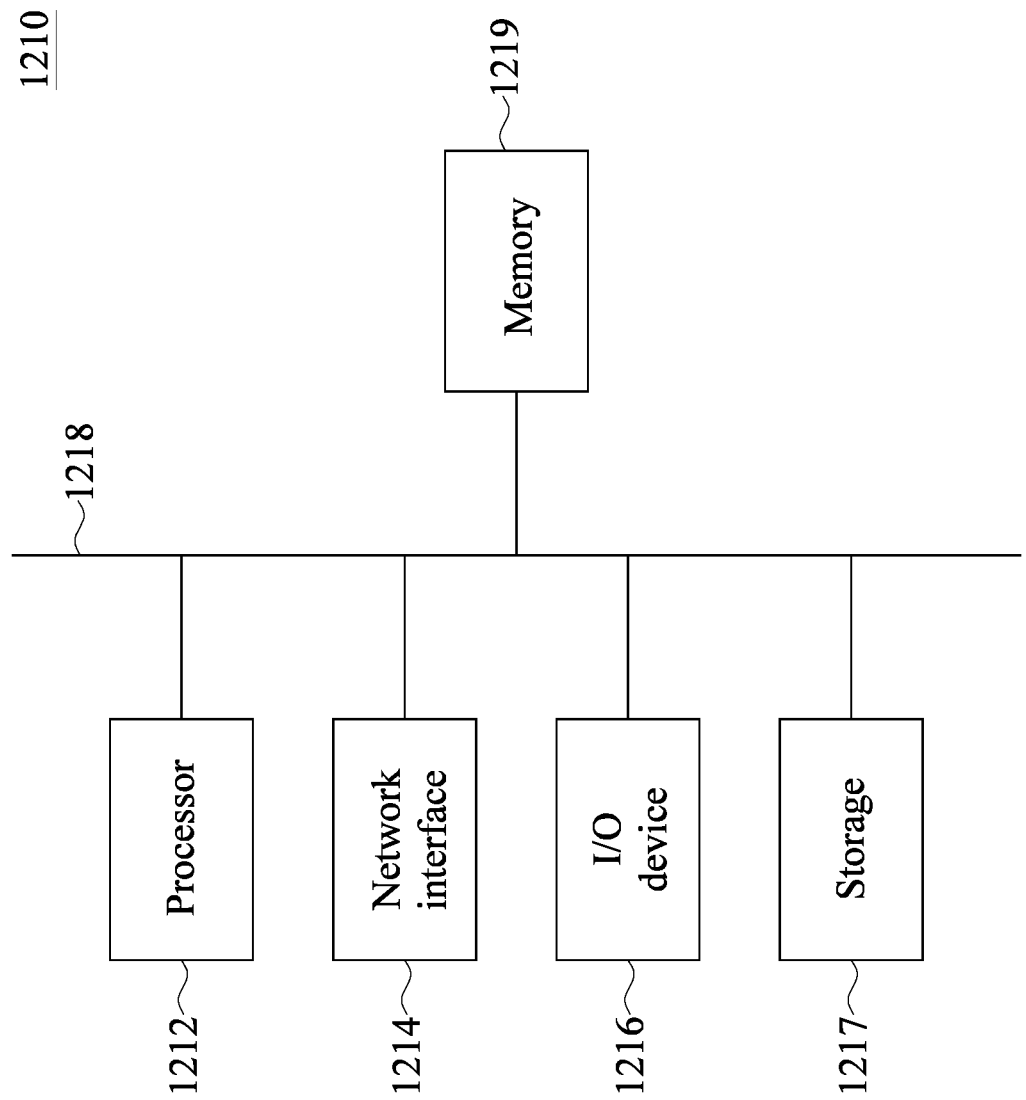
FIG. 12B is a schematic diagram of a design subsystem in the IC manufacturing system shown in FIG. 12A for generating a design layout, in accordance with some embodiments.

FIG. 12B is a schematic diagram of the design subsystem 1210 of the IC manufacturing system 1200 shown in FIG. 12A for generating or storing the design layouts 1250 discussed above, in accordance with some embodiments. In some embodiments, the design subsystem 1210 is a computer system. The design subsystem 1210 includes a processor 1212, a network interface 1214, an input and output (I/O) device 1216, a storage device 1217, a memory 1219, and a bus 1218. The bus 1218 couples the network interface 1214, the I/O device 1216, the storage device 1217, the memory 1219 and the processor 1212 to each other.

The processor 1212 is configured to execute program instructions that include a tool configured to generate the design layouts as described and illustrated with reference to figures of the present disclosure.

The network interface 1214 is configured to access program instructions and data accessed by the program instructions stored remotely through a network (not shown).

The I/O device 1216 includes an input device and an output device configured for enabling user interaction with the circuit design subsystem 1210. In some embodiments, the input device includes, for example, a keyboard, a mouse, and other devices. Moreover, the output device includes, for example, a display, a printer, and other devices.

The storage device 1217 is configured for storing the design layouts, program instructions and data accessed by the program instructions. In some embodiments, the storage device 1217 includes a standard cell library for storing the data of the standard cells as discussed in the present disclosure. In some embodiments, the storage device 1217 includes a non-transitory computer-readable storage medium, for example, a magnetic disk and an optical disk.

The memory 1219 is configured to store program instructions to be executed by the processor 1212 and data accessed by the program instructions. In some embodiments, the memory 1219 includes any combination of a random-access memory (RAM), some other volatile storage device, a read-only memory (ROM), and some other non-volatile storage device.

According to an embodiment, a layout method, executed by at least one processor, includes: generating a design data comprising an electronic circuit, and generating a design layout by placing a first cell corresponding to the electronic circuit. The first cell includes a first source/drain region and a second source/drain region in a first layer and a gate electrode extending in a first direction in a second layer over the first layer, wherein the gate electrode define an odd-numbered track and an even-numbered track within the first cell. The first cell also includes a first power rail extending in a second direction perpendicular to the first direction in a third layer over the second layer; a first conductive via arranged in a fourth layer between the second and third layers and directly below the first power rail, the first conductive via being within the odd-numbered track; a second power rail extending in the first direction in a fifth layer over the third layer; and a second conductive via arranged in a sixth layer between the third and fifth layers and directly below the second power rail, the second conductive via being within the even-numbered track. The first source/drain region is electrically connected to the first power rail through the first conducive via, and the second source/drain region is electrically connected to the second power rail through the second conducive via.

According to an embodiment, a layout method, executed by at least one processor, includes: generating a design data comprising an electronic circuit, and generating a design layout by placing a first cell and a second cell corresponding to the electronic circuit. Each of the first and second cells includes: a first source/drain region and a second source/drain region in a first layer, and a gate electrode extending in a first direction in a second layer over the first layer and between the first and second source/drain regions, wherein the gate electrode defines an odd-numbered track and an even-numbered track within the first cell. Each of the first and second cells also includes a first power rail extending in a second direction perpendicular to the first direction in a third layer over the second layer. The second cell further includes a second power rail extending in the second direction in a fourth layer over the third layer. The first source/drain region of the first cell is electrically connected to the first power rail through a conductive via arranged directly below the first power rail within the odd-numbered track, and the first source/drain region of the second cell is electrically connected to the second power rail through a second conductive via arranged directly below the second power rail within the even-numbered track.

According to an embodiment, a semiconductor device includes a first cell and a second cell corresponding to a same electronic circuit, and wherein each of the first and second cells includes a first source/drain region and a second source/drain region in a first layer, and a gate electrode extending in a first direction in a second layer over the first layer and between the first and second source/drain regions, wherein the gate electrode defines an odd-numbered track and an even-numbered track within the first cell. Each of the first and second cells also includes a first power rail extending in a second direction perpendicular to the first direction in a third layer over the second layer. The second cell further includes a second power rail extending in the second direction in a fourth layer over the third layer. The first source/drain region of the first cell is electrically connected to the first power rail through a conductive via arranged directly below the first power rail within the odd-numbered track, and the first source/drain region of the second cell is electrically connected to the second power rail through a second conductive via arranged directly below the second power rail within the even-numbered track.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout method, executed by at least one processor, comprising:
   generating a design data comprising an electronic circuit; and
   generating a design layout by placing a first cell corresponding to the electronic circuit, wherein the first cell comprises:
   a first source/drain region and a second source/drain region in a first layer;
   a plurality of gate electrodes extending in a first direction in a second layer over the first layer, the plurality of gate electrodes defining at least one odd-numbered track and at least one even-numbered track within the first cell, the at least one odd-numbered track alternatively arranged with the at least one even-numbered track;
   a first power rail extending in a second direction perpendicular to the first direction in a third layer over the second layer;
   a first conductive via arranged in a fourth layer between the second and third layers and directly below the first power rail, the first conductive via being within a first odd-numbered track of the at least one odd-numbered track and non-overlapped with any of the plurality of gate electrodes from a top-view perspective;
   a second power rail extending in the second direction in a fifth layer over the third layer, wherein a longitudinal axis of the first power rail or the second power rail is overlapped with a boundary of the first cell; and
   a second conductive via arranged in a sixth layer between the third and fifth layers and directly below the second power rail, the second conductive via being within a first even-numbered track of the at least one even-numbered track and non-overlapped with any of the plurality of gate electrodes from a top-view perspective,
   wherein the first source/drain region is electrically connected to the first power rail through the first conductive via, and the second source/drain region is electrically connected to the second power rail through the second conductive via.

2. The layout method according to claim 1, further comprising manufacturing the electronic circuit according to the design layout.

3. The layout method according to claim 1, wherein the first power rail has a first width in the first direction, and the second power rail has a second width in the first direction in a range between two times the first width and 3.5 times the first width.

4. The layout method according to claim 1, wherein the first cell further comprises a first conductive line arranged in the second layer parallel to the plurality of gate electrodes, and the first source/drain region is electrically connected to the first power rail through the first conductive line.

5. The layout method according to claim 4, wherein the first conductive line is arranged within the first odd-numbered track.

6. The layout method according to claim 1, wherein generating a design layout comprises designating numbers of tracks of the design layout, and wherein the placing of the first cell comprises fitting the first odd-numbered track of the first cell into an odd-numbered track of the design layout.

7. The layout method according to claim 1, wherein the first cell further comprises a third power rail extending in the second direction in the third layer parallel to the first power rail, wherein the first power rail and the second power rail are configured to supply a first voltage and a second voltage, respectively.

8. The layout method according to claim 7, wherein the first cell further comprises second conductive lines extending in the second direction in the third layer and equally spaced between the first and third power rails, and the second source/drain region is electrically connected to the second power rail through one of the second conductive lines.

9. The layout method according to claim 8, wherein the first cell further comprises a third conductive line extending in the first direction in a seventh layer between the third and sixth layers and electrically connecting the second conductive via to the one of the second conductive lines.

10. The layout method according to claim 9, wherein the third conductive line is arranged within the first even-numbered track.

11. The layout method according to claim 9, wherein the third conductive line overlaps the second conductive via from a top-view perspective and is electrically connected to the second power rail through the second conductive via.

12. The layout method according to claim 8, wherein the first cell further comprises a fourth conductive line extending in the first direction in the second layer and electrically connecting the second source/drain region to the one of the second conductive lines, wherein the fourth conductive line is within the first even-numbered track.

13. The layout method according to claim 12, wherein the second source/drain region is within the first even-numbered track.

14. The layout method according to claim 8, wherein the first cell further comprises a third conductive via arranged in the fourth layer within the first odd-numbered track, wherein a pitch between the first conductive via and the third conductive via is at least two times a pitch of the second conductive lines.

15. The layout method according to claim 1, further comprising placing a second cell corresponding to the electronic circuit in the design layout, wherein the second cell comprises:
a first source/drain region and a second source/drain region in the first layer;
a gate electrode extending in the first direction in the second layer over the first layer, the gate electrode defining an odd-numbered track and an even-numbered track within the second cell;
a first power rail extending in the second direction perpendicular to the first direction in the third layer;
a second power rail and a third power rail extending in the second direction in the fifth layer; and
a first conductive via and a second conductive via arranged in the sixth layer between the third and fifth layer,
wherein the first source/drain region is electrically connected to the third power rail through the first conductive via and the second source/drain region is electrically connected to the second power rail through the second conductive via.

16. The layout method according to claim 15, wherein the second cell further comprises a fifth conductive line extending in the first direction in a seventh layer between the third and sixth layers and electrically connecting the first conductive via to the first source/drain region.

17. A layout method, executed by at least one processor, comprising:
generating a design data comprising an electronic circuit; and
generating a design layout by placing a first cell and a second cell corresponding to the electronic circuit, wherein each of the first and second cells comprises:
a first source/drain region and a second source/drain region in a first layer;
a plurality of gate electrodes extending in a first direction in a second layer over the first layer and between the first and second source/drain regions, the plurality of gate electrodes defining at least one odd-numbered track and at least one even-numbered track within the first cell, the at least one odd-numbered track alternatively arranged with the at least one even-numbered track; and
a first power rail extending in a second direction perpendicular to the first direction in a third layer over the second layer,
wherein the second cell further comprises a second power rail extending in the second direction in a fourth layer over the third layer,
wherein the first source/drain region of the first cell is electrically connected to the first power rail through a first conductive via arranged directly below the first power rail within a first odd-numbered track of the at least one odd-numbered track, and the first source/drain region of the second cell is electrically connected to the second power rail through a second conductive via arranged directly below the second power rail within a first even-numbered track of the at least one even-numbered track,
wherein the first conductive via of the first cell is non-overlapped with any of the plurality of gate electrodes of the first cell, and the second conductive via of the second cell is non-overlapped with any of the plurality of gate electrodes of the second cell.

18. The layout method according to claim 17, wherein the first cell further comprises a first conductive line in the second layer within the at least one odd-number track and electrically connecting the first source/drain region to the first conductive via.

19. The layout method according to claim 17, wherein the second conductive via is arranged in a layer between the third and fourth layers.

20. A layout method, executed by at least one processor, comprising:
generating a design data comprising an electronic circuit; and generating a design layout by placing a first cell and a second cell corresponding to the electronic circuit, wherein each of the first and second cells comprises:

a first source/drain region and a second source/drain region in a first layer;

a plurality of gate electrodes extending in a first direction in a second layer over the first layer and between the first and second source/drain regions, the gate electrodes defining at least one odd-numbered track and at least one even-numbered track within the first cell, the at least one odd-numbered track alternatively arranged with the at least one even-numbered track;

a first power rail extending in a second direction perpendicular to the first direction in a third layer over the second layer; and a second power rail extending in the second direction in a fourth layer over the third layer, wherein the first source/drain region of each of the first and second cells is electrically connected to the respective first power rail through a first conductive via arranged within first odd-numbered tracks of the respective first and second cells, and the first conductive via is non-overlapped with any of the plurality of gate electrodes of the first and second cells, wherein the second source/drain region of each of the first and second cells is electrically connected to the respective second power rail through a second conductive via arranged within first even-numbered tracks of the respective first and second cells, and the second conductive via is non-overlapped with any of the plurality of gate electrodes of the first and second cells.

* * * * *